United States Patent
Gorohata et al.

(10) Patent No.: US 8,122,593 B2
(45) Date of Patent: Feb. 28, 2012

(54) WEAVING MACHINE FOR COIL ASSEMBLY OF ROTARY ELECTRIC MACHINE

(75) Inventors: Tetsuya Gorohata, Anjo (JP); Akito Akimoto, Kariya (JP)

(73) Assignee: Denso Corporation, Kariya (JP)

(*) Notice: Subject to any disclaimer, the term of this patent is extended or adjusted under 35 U.S.C. 154(b) by 558 days.

(21) Appl. No.: 12/398,567

(22) Filed: Mar. 5, 2009

(65) Prior Publication Data

US 2009/0224092 A1 Sep. 10, 2009

(30) Foreign Application Priority Data

Mar. 5, 2008 (JP) ................................. 2008-055423

(51) Int. Cl.
*H02K 15/00* (2006.01)

(52) U.S. Cl. ............. 29/729; 29/596; 29/602.1; 29/760; 29/759; 29/33 F; 242/432.5; 242/432.6; 269/58

(58) Field of Classification Search ............ 29/735–736, 29/596–598, 33 F, 825, 602.1, 605, 180, 29/184, 203, 206, 207; 269/58–60; 242/432, 242/432.2–432.5

See application file for complete search history.

(56) References Cited

U.S. PATENT DOCUMENTS

| | | | | | |
|---|---|---|---|---|---|
| 1,340,712 | A * | 5/1920 | Hare | ........................ | 242/395.1 |
| 4,351,102 | A * | 9/1982 | Grozinger et al. | ............. | 29/596 |
| 6,140,735 | A * | 10/2000 | Kato et al. | ..................... | 310/201 |
| 6,376,961 | B2 * | 4/2002 | Murakami et al. | ............ | 310/184 |
| 6,501,205 | B1 * | 12/2002 | Asao et al. | ..................... | 310/184 |
| 6,707,211 | B2 * | 3/2004 | Oohashi et al. | ............... | 310/179 |
| 6,760,965 | B2 * | 7/2004 | Asao et al. | ....................... | 29/596 |
| 6,865,796 | B1 * | 3/2005 | Oohashi et al. | ................. | 29/596 |
| 6,951,054 | B2 * | 10/2005 | Hirota et al. | ..................... | 29/596 |
| 7,365,467 | B2 * | 4/2008 | Bramson et al. | ............. | 310/180 |
| 7,386,931 | B2 * | 6/2008 | Neet et al. | ........................ | 29/596 |
| 7,804,217 | B2 * | 9/2010 | Hasegawa et al. | ............ | 310/179 |
| 7,812,498 | B2 * | 10/2010 | Kouda | ........................... | 310/201 |
| 7,856,701 | B2 * | 12/2010 | Hirota et al. | .................... | 29/596 |
| 7,948,143 | B2 * | 5/2011 | Nakamura | .................... | 310/201 |
| 7,952,250 | B2 * | 5/2011 | Hasegawa et al. | ............ | 310/179 |
| 8,008,830 | B2 * | 8/2011 | Kouda et al. | .................. | 310/201 |
| 2001/0019234 | A1 * | 9/2001 | Murakami et al. | ............ | 310/180 |
| 2001/0047580 | A1 * | 12/2001 | Stratico et al. | .................. | 29/596 |
| 2002/0030417 | A1 * | 3/2002 | Asao | ............................. | 310/201 |

(Continued)

FOREIGN PATENT DOCUMENTS

JP 2002-176752 6/2002

(Continued)

*Primary Examiner* — Derris Banks
*Assistant Examiner* — Kaying Kue
(74) *Attorney, Agent, or Firm* — Nixon & Vanderhye PC

(57) ABSTRACT

A weaving machine for an rotary electric machine coil assembly is disclosed including a rotating and driving section having timing belts causing rotary pulleys to rotate about their axes under the same attitudes while causing the rotary pulleys to rotate about an axis of a stationary pulley, movable members placed on the rotary pulleys to be movable in X- and Y-directions, coil feed magazines inclined such that coil wire segments have one ends slidably supported on the movable members and axes of the coil wire segments cross on a rotating axis of the rotary table, an orbit specifying member for specifying an orbit, in which the coil feed magazines are caused to rotate, in a rectangular shape, a rotating and driving member for permitting the coil feed magazines to perform synchronized rotating movements, and a coil transfer device operative to grip the coil wire segment for transfer.

14 Claims, 16 Drawing Sheets

U.S. PATENT DOCUMENTS

| | | |
|---|---|---|
| 2002/0092152 A1* | 7/2002 | Asao et al. .................. 29/596 |
| 2004/0040142 A1 | 3/2004 | Hirota et al. |
| 2006/0005376 A1 | 1/2006 | Hirota et al. |
| 2008/0179983 A1* | 7/2008 | Hasegawa et al. ........... 310/179 |
| 2009/0260219 A1* | 10/2009 | Takada et al. ................ 29/596 |
| 2010/0077599 A1* | 4/2010 | Tokizawa .................... 29/596 |
| 2010/0141078 A1* | 6/2010 | Kouda et al. ................ 310/195 |
| 2010/0187938 A1* | 7/2010 | Yamamoto et al. .......... 310/195 |
| 2010/0244615 A1* | 9/2010 | Kouda ......................... 310/215 |

FOREIGN PATENT DOCUMENTS

| | | |
|---|---|---|
| JP | 2003-523064 | 7/2003 |
| JP | 2004-104841 | 4/2004 |
| JP | 2004-152656 | 5/2004 |
| JP | 2005-012922 | 1/2005 |

* cited by examiner

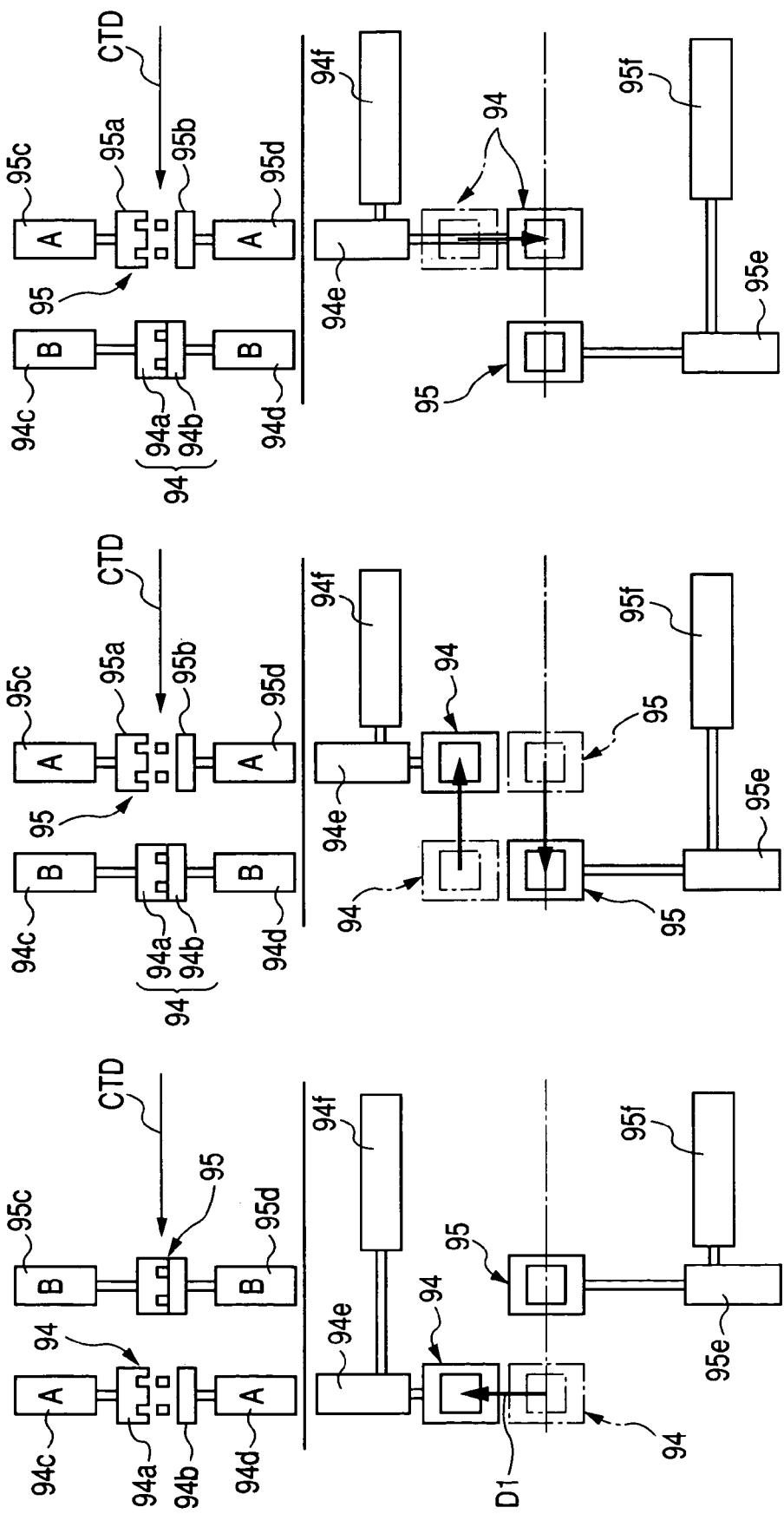

WEAVING MACHINE FOR COIL ASSEMBLY OF ROTARY ELECTRIC MACHINE

CROSS REFERENCE TO RELATED APPLICATIONS

This application is based on Japanese Patent Application No. 2008-55423, filed on Mar. 5, 2008, the content of which is hereby incorporated by reference.

BACKGROUND OF THE INVENTION

1. Technical Field of the Invention

The present invention relates to a weaving machine for a coil assembly of a rotary electric machine.

2. Description of the Related Art

In the related arts, various methods have heretofore been proposed as a method of manufacturing a coil assembly of a rotary electric machine. For instance, Japanese Patent Application Publication 2002-176752 proposes a method in which a plurality of coil wire segments are simultaneously woven using a pair of plate-like winding cores placed in opposition to each other. Japanese Patent Application Publication 2004-104841 proposes a weaving method and a manufacturing apparatus for carrying out such a weaving method. In this method, operations are repeatedly executed to perform step of rotating one coil wire segment about its axis by 90 degrees with respect to the other coil wire segment while causing one coil wire segment to advance to the other coil wire segment by a half turn so as to increase an overlapping state between these coil wire segments and step of rotating one coil wire segment about its axis further by another angle of 90 degrees whereby one coil wire segment is sequentially woven into the other coil wire segment by a half turn.

Examples of a method of weaving a plurality of coil wire segments, each having a plurality of run portions, with respect to each other conceivably include methods listed below. Like the related art weaving machine being in use, for instance, there is one method in which the plural coil wire segments are woven with one coil wire segment caused to rotate (in revolution) on a circular orbit about the other coil wire segment placed in a fixed state while permitting the other coil wire segment to shift in a coil lengthwise direction by a coil pitch in one revolution. Another method is to weave two coil wire segments upon holding weaving areas of the two coil wire segments at a given angle with respect to a center and causing one of the two coil wire segments to rotate (in revolution) about the other one of the two coil wire segments on the circular orbit.

However, these methods are required to prepare the two coil wire segments crossing at an increased angle between an axis of one coil wire segment and an axis of the other coil wire segment. This results in an issue of deformations easily occurring in the coil wire segments and an issue of difficulties in carrying out weaving operations in a reliable manner at a high speed.

SUMMARY OF THE INVENTION

The present invention has been completed with a view to addressing the above issues and has an object to provide a weaving machine for a rotary electric machine coil assembly that can reliably weave coil wire segments at a high speed with a less frequency of deformations on the coil wire segments.

Hereunder, various means, suitable for addressing the above issues, will be described below with reference to various advantageous effects.

To achieve the above object, one aspect of the present invention provides a weaving machine for manufacturing a coil assembly of an rotary electric machine upon weaving a plurality of coil wire segments, each having a plurality of turn portions, the weaving machine comprising: a rotating and driving section including a stationary pulley coaxially fixed to a shaft column mounted on a base, a rotary member rotatably supported with the shaft column to be rotatable about a center axis of the shaft column, a plurality of rotary pulleys supported with the rotary member to be rotatable relative to each other, and drive-force transmitting members, tensioned between the rotary pulleys and the stationary pulley, which are operative to allow the rotary pulleys to rotate on their axes while rotating about an axis of the stationary pulley under the same attitudes; a plurality of moving members located above the rotary pulleys to be movable in X- and Y-directions on a plane perpendicular to a rotating axis of the rotary member; a plurality of coil feed magazines placed in inclined states and including first transfer paths through which the coil wire segments are transferred, which have one ends supported on the moving members via pivots for freely rocking movements to allow the coil wire segments to be transferred through the first transfer paths to the other ends of the first transfer paths such that axes of the coil wire segments cross each other on the rotating axis; an orbit specifying member for specifying an orbit along which the coil feed magazines rotate; a rotation synchronizing member for causing the coil feed magazines to rotate in synchronism with each other; and a coil transfer device operative to permit woven coil wire segments, placed under the turn portions of the coil wire segments cross each other, to be gripped and transferred.

When manufacturing the coil assembly of the rotary electric machine with the use of the weaving machine of such a structure, the coil wire segments, having the plural turn portions, are set in a manner described below for preparation. First, the coil wire segments are inserted to the first transfer passages of the coil feed magazines at the inlet portions thereof, respectively, after which the turn portions of the coil wire segments are crossed with each other in an overlapping state at a position where respective axes of the coil wire segments cross each other at the outlets of the first passages. When this takes place, the turn portions of the crossing coil wire segments have a phase angle difference of 0 degree and, similarly, the coil feed magazines have a phase angle difference of 0 degree. Thereafter, the gripping section of the coil transfer device grips end portions of the coil wire segments with the coil wire segments having end portions crossed each other at the turn portions, upon which the preparation is completed.

With the beginning in operation of the weaving machine under such a state, the coil transfer device allows the coil wire segments, set in the manner set forth above, to be delivered from the outlets of the first transfer passages of the coil feed magazines toward the position at which the respective axes of the coil wire segments cross each other. At the same time, the drive power transmitting members of the rotating and driving section operates. This allows the rotary pulleys to rotate on their axes and revolve about the axis of the stationary pulley while sustaining the same attitude with the rotating members caused to rotate about the center axis of the stationary pulley.

Under such a state, the coil feed magazines, having the ends swingably connected to the respective movable members, are mounted on the respective rotary pulleys via the pivots to be movable in the X- and Y-directions. As the coil feed magazines rotate about their axes, the coil feed magazines revolve about the center axis of the stationary pulley with the same attitude being sustained. When this takes place, the rotation synchronizing members allow the coil feed magazines to revolve in synchronism with each other in a rotating orbit defined with the orbit specifying member. Therefore, the coil wire members, transferred through the first transfer passages of the coil feed magazines, revolve about the center axis of the stationary pulley under the same attitude like the rotational movements of the coil feed magazines.

With such revolving movements, the coil wire segments, transferred from the first transfer passages in rotations, the turn portions of the coil wire segments sequentially cross each other to be woven with no interference between the turn portions of the coil wire segments during the movements of the coil wire segments to pass across the position where the axes of the coil wire segments cross each other. Subsequently, the woven coil wire segments with the turn portions crossing each other are guided to the outlet of the second transfer passage of the woven coil wire magazine to be transferred to the outlet side. Thus, the succeeding turn portions of the coil wire segments are caused to cross each other in a sequence until the final run portions are woven.

With the weaving machine of such a structure set forth above, accordingly, the coil wire segments, transferred through the first transfer passages of the coil feed magazines, are caused to revolve on the specified orbit under the same attitude, thereby enabling the turn portions of the coil wire segments to be reliably woven with no interference between the relevant run portions of the coil wire segments. Especially, when the turn portions of the coil wire segments cross each other in an overlapping state, the angle between the axes of the coil wire segments can be minimized. This makes it possible to prevent the occurrence of deformation encountered with the coil wire segments during the weaving operation thereof at a lower rate than that achieved when the coil wire segments are caused to revolve on a circular orbit. In addition, providing the orbit specifying member for specifying a revolving orbit for the coil wire segments makes it possible to allow the coil feed magazines to easily rotate at high speeds, thereby realizing the weaving operation at a high speed.

With the weaving machine of such a structure set forth above, further, the rotating and driving section includes the stationary pulley, the rotating members, the plurality of rotary pulleys and the drive power transmitting members. The stationary pulley is fixedly mounted on the shaft column in a coaxial relationship and does not rotate or move in position. Moreover, the rotary pulleys are supported on the rotating members to rotate relative to each other and the rotary pulleys revolve about the center axis of the stationary pulley under freely rotating states about their axes. With the stationary pulley having the same number of teeth as that of each rotating pulley, each rotary pulley rotates one turn when each rotary pulley revolves about the axis of the stationary pulley by one turn, thereby making it possible to reliably sustain the same attitude.

The drive power transmitting member, achieving a transfer of drive power between the stationary pulley and the rotary pulleys, may preferably include, for instance, a timing belt or a chain, etc. However, the drive power transmitting member is not limited to a particular component part and may adopt another component part unless a slippage is not caused to occur between the pulleys. The rotating and driving section may be actuated upon driving the drive power transmitting member with, for instance, a drive source such as a motor.

The plurality of movable members is mounted on the rotary pulleys, respectively, to be movable in an X- and Y-direction on a plane perpendicular to the rotating axis of the rotary member. The movable members permit the ends of the coil feed magazines, swingably supported on the movable members via the pivots, to freely move in the X- and Y-directions. Means for enabling the coil feed magazines in the X- and Y-directions may include, for instance, an XY moving table having an X-table extending in the X-direction and a Y-table extending in the Y-direction.

Another alternative may include, for instance, a structure in which the rotary pulleys of the rotating and driving section are used as idling pulleys (first rotary pulleys), which additionally includes: a plurality of connecting members having ends pivotally connected to the shaft portions of the idling pulleys (first rotary pulleys); and a plurality of second rotary pulleys supported on the other ends of the connecting members to be rotatable relative to each other while rotating about their axes via the drive power transmitting member and rotating about the axes of the idling pulleys (first rotary pulleys). With such a structure, the movable members are mounted on the second pulleys. Also, third rotary pulleys may be further connected to the second rotary pulleys like the structure in which the second rotary pulleys are additionally provided. In this case, the second rotary pulleys act as the idling pulleys and the movable members are located on the third rotary pulleys.

With the weaving machine of the structure set forth above, the number of coil feed magazines, having the first transfer passages through which the coil wire segments are transferred, may be suitably determined depending on the number of coil wire segments to be woven. Under a circumstance where a unitary structure is used with a plurality of coil wire segments being woven or assembled to each other, the unitary structure can be regarded to be one coil wire segment and, hence, a suitable number of coil feed magazines can be employed depending on the number of unitary structures of the coil wire segments. The coil feed magazines may be preferably placed on a rotating orbit at equidistantly spaced angular intervals.

The plurality of coil feed magazines may be preferably placed in positions such that an angle between the axes of the respective coil wire segments transferred through the first passages falls in a range of 5 degrees or more and 45 degree or less with respect to the axis of the shaft column. The first transfer passages may be suitably formed in cross-sectional shapes in conformity to sizes and shapes of the coil wire segments to be used. With a view to permitting the coil wire segments to smoothly transfer or to preventing deformations of the coil wire segments during travels thereof, the first transfer passages may be preferably formed in linear shapes as straight as possible. In addition, the first transfer passages may preferably have smooth transfer surfaces with small frictional resistances as low as possible.

With the weaving machine of the structure set forth above, the orbit specifying members serve to specify a rectangular orbit for the respective coil feed magazines to rotate. For the purpose of causing the coil feed magazines to rotate along orbits in stabilized conditions, the orbit specifying members may be preferably located at plural positions for the coil feed magazines along longitudinal directions thereof. Each of the orbit specifying members may preferably adopt a structure composed of a template, having an outer circumferential periphery describing a specified orbit, and a spring member operative to urge each coil feed magazine to an edge of the outer circumferential periphery of the template. Moreover, it may be possible to adopt a template formed with a guide recess for guiding each coil feed magazine.

With the weaving machine of the structure set forth above, the rotation synchronizing members serve to allow the coil feed magazines to perform the rotating movements in synchronism with each other during a phase in which the coil feed magazines rotate in the specified orbit about the center axis of the shaft column. With a view to allow the coil feed magazines to move in stabilized synchronized rotations, the rotation synchronizing members may be preferably located in a plurality of positions for the coil feed magazines along the longitudinal directions thereof.

With the weaving machine of the structure set forth above, the coil transfer device, located in an area at the outlets of the first transfer passages, serve to grip the woven coil wire segments with the turn portions of the coil wire segments placed in crossed states for transfer the woven coil wire segments. The coil transfer device may preferably adopt a structure including, for instance, a clamper for gripping the woven coil wire segments and moving means for moving such a clamper or another structure in which the first and second transfer belts are arranged to pinch the woven coil wire segments, etc.

Further, the weaving machine of the structure set forth above makes it possible to perform the weaving of a plurality of coil wire segments of more than two wire segments. Furthermore, it becomes possible to weave the unitized forms with the plural coil wire segments being woven or assembled to each other. To this end, for instance, component parts, such as coil gripping members, of the coil transfer device may be replaced with the other component parts depending on needs.

Coil assemblies, manufactured with the weaving machine of the structure set forth above, may be preferably used in a rotary electric machine including, for instance, a rotor having a plurality of magnetic pole pieces alternately different in pole along a circumferential direction, and a stator having an inner circumferential periphery or an outer circumferential periphery placed in face-to-face relation to the rotor. The coil assemblies have cross-sectional shapes formed in nearly rectangular wire segments that are accommodated in a plurality of slots formed on a stator core at circumferentially spaced positions for thereby constituting a multi-phase stator windings.

Further, the coil wire segment may preferably have in-slot portions disposed in the slots formed in different circumferentially spaced positions of the stator core and a turn portion extending to the outside of the slots and correcting the in-slot portions to each other. The turn portion has a protruding area, protruding from the slots, which is formed in a cranked shape with both ends directed toward the slots in which the coil wire segment is accommodated in a straddling state. In addition, the turn portion may have a nearly central area formed in a cranked shape in the absence of a twisting state. In another alternative, the nearly central area of the turn portion formed in the cranked shape may be formed in a cranked shape dislocated from the center of the turn portion by a value equivalent to a nearly width of the coil wire segment. In addition, the coil wire segment may be of the type that is continuously formed around a whole circumference of the stator core.

With the weaving machine of the present invention, the orbit, specified with the orbit specifying member, may preferably have a nearly rectangular or oblong shape.

With such a structure, the rotating orbit for the coil feed magazines and the coil wire segments is specified in the nearly rectangular or oblong shape, thereby making it possible to allow the coil wire segments to be woven under a condition in which a crossing angle between the relevant coil wire segments remains minimized with no interference between the turn portions of the relevant coil wire segments. This enables the weaving of the coil wire segments to be reliably performed while preventing the occurrence of deformations on the coil wire segments.

With the weaving machine of the present invention, the rotary table may preferably have the same number of teeth as that of the stationary pulley and rotates one revolution about an axis of the rotary table in an identical attitude when rotates one revolution about an axis of the stationary pulley.

With such a structure, each rotary table rotates one turn when revolving one revolution about the axis of the stationary table, making it possible to allow the rotary tables to be reliably maintained under the same attitude. This makes it possible to allow the turn portions of the coil wire segments to smoothly and reliable cross each other, thereby ensuring reliability of performing the weaving of the coil wire segments while making it possible to realize the weaving at a high speed.

With the weaving machine of the present invention, the movable members may be preferably disposed on XY movable tables, each XY movable table including an X-table having X-rails extending in an X-direction and placed corresponding rotary pulley, and a Y-table having Y-rails extending in a Y-direction and placed on the X-table.

With such a structure, means for enabling the movable members to move in the X- and Y-directions can be realized in a simplified structure.

With the weaving machine of the present invention, the rotating and driving section may preferably include the rotary pulleys made operative to act as idling rotary pulleys, a plurality of connecting members each having one end rotatably connected to shaft portions of the connecting members, respectively, a plurality of second rotary tables supported with the other ends of the connecting members to be rotatable relative to each other, and drive-force transmitting members extending between the second rotary pulley and the idling rotary pulley, wherein the movable members are mounted on the second rotary pulleys, respectively.

With such a structure, means for enabling the movable members to move in the X- and Y-directions can be realized in a simplified structure in place of the XY tables set forth above.

With the weaving machine of the present invention, the orbit specifying member may be preferably provided so as to specify the orbit at plural positions in longitudinal directions of the coil feed magazines.

With such a structure, the coil feed magazines can be rotated in the nearly rectangular or oblong orbit under a stabilized fashion, thereby making it possible to more reliably perform the weaving of the coil wire segments in a stabilized fashion. Further, in this case, since the coil feed magazines are placed at inclined angles with respect to the shaft column, the nearly rectangular or oblong shape of the orbit specified with the orbit specifying member has a similarity relation.

With the weaving machine of the present invention, the orbit specifying member may preferably include a template having an outer periphery formed in a rectangular shape, and a spring member for urging the coil feed magazines to be pressed against an outer circumferential edge of the template.

With such a structure, an urging force of the spring member enables the coil feed magazines to be reliably pressed against the outer circumferential edge of the template formed in the nearly rectangular or oblong shape. This makes it possible to specify the nearly rectangular or oblong orbit for the coil feed magazines to be specified with increased precision. In addition, the orbit specifying member can be realized in a simplified structure.

With the weaving machine of the present invention, the orbit specifying member may preferably include a template formed with a rectangular guide recess for specifying rotating orbits of the coil feed magazines.

With such a structure, the nearly rectangular or oblong orbit for the coil feed magazines is specified with the guide recess formed in the template, thereby making it possible to specify the nearly rectangular or oblong orbit for the coil feed magazines to be specified with increased precision. In addition, the orbit specifying member can be realized in a simplified structure.

With the weaving machine of the present invention, the rotation synchronizing member may preferably have elongated slots, admitting the coil feed magazines to be inserted and held therein, for permitting the coil feed magazines to be displaced in a centripetal direction and a radial direction while restricting the coil feed magazines from being displaced in a rotating direction.

With such a structure, the coil feed magazines can be reliably synchronized in operation with the use of the elongated slots formed in the rotating and synchronizing member. In addition, the rotating and synchronizing member can be realized in a simplified structure.

With the weaving machine of the present invention, the coil transfer device may preferably include clampers for gripping the woven coil wire segments, respectively, and moving means for moving the clampers.

With such a structure, the coil transfer device can be realized in an extremely simplified structure which can transfer the woven coil wire segments in a reliable and stabilized manner. In addition, the moving means for moving the clampers may preferably take the form of, for instance, a structure composed of a pinion and rack mechanism or another structure including a drive source such as an air cylinder, etc.

With the weaving machine of the present invention, the coil transfer device may preferably include first and second clampers placed on coil transfer paths in parallel to each other, respectively, first vertical-direction moving means for moving the first clamper in a direction perpendicular to a coil transfer direction, first transfer-direction moving means for moving the first clamper in forward or rearward direction along the coil transfer direction, second vertical-direction moving means for moving the second clamper in the direction perpendicular to the coil transfer direction, and second transfer-direction moving means for moving the second clamper in the forward or rearward direction along the coil transfer direction.

With such a structure, the coil transfer device can be realized in an extremely simplified structure which can transfer the woven coil wire segments in a reliable and stabilized manner. In this case, the two clampers are used, resulting in further increases in reliability and stability of achieving transfers of the woven coil wire segments. Moreover, the moving means, used in such a case, may preferably take the form of, for instance, a structure including a drive source such as, for instance, an air cylinder, etc.

With the weaving machine of the present invention, the coil transfer device may preferably include a first belt, and a second belt placed in opposition to the first belt, wherein the woven coil wire segments are pinched between the first and second belts to be transferred.

With such a structure, the coil transfer device can be realized in an extremely simplified structure enabling the transfers of the woven coil wire segments in a reliable and stabilized manner.

With the weaving machine of the present invention, a coil guide may be preferably located on the coil feed magazines at outlets thereof for guiding the coil wire segments, transferred from the outlets of the first transfer paths, to a weaving section.

With such a structure, the coil guide reliably guides the coil wire segments, transferred from the outlets of the first transfer passages, to the weaving section with increased precision, thereby making it possible to allow the turn portions of the coil wire segments to cross each other in a further reliable manner with increased precision. Thus, the coil wire segments can be woven in a reliable manner with increased precision.

With the weaving machine of the present invention, a woven coil feed magazine may be preferably located on the coil feed magazines at outlets thereof and having second transfer paths for transferring the woven coil wire segments.

With such a structure, the second transfer passage enables the transfer of the woven coil wire segments, resulting in a capability of smoothly transferring the woven coil wire segment with no occurrence of deformation. This enables the coil wire segments to be delivered from the outlets of the coil feed magazines in a smooth fashion, thereby enabling the weaving of the coil wire segments in a smooth and reliable fashion.

Further, a woven coil magazine is located at a given position near the outlets of the coil feed magazines to allow the woven coil wire segments with the turn portions placed in a crossing state to be transferred from the inlet of the second transfer passage. The woven coil magazine may be preferably have an axis located at a position aligned on an extended line of the axis (rotating axis of the rotary member 9 of the shaft column. With such an arrangement, the coil wire segments can be more smoothly transferred. The second transfer passage may have a cross-sectional shape that is suitably determined in accordance with sizes and shapes of the coil wire segments to be transferred. Like each of the first transfer passages, the second transfer passage may be preferably formed in a linear shape as straight as possible and, further, the second transfer passage may have a transfer surface that has a small frictional resistance as low as possible.

BRIEF DESCRIPTION OF THE DRAWINGS

These and other features and advantages of the present invention will become more apparent in light of the following description, as illustrated in the accompanying drawings, in which:

FIGS. 22A to 22C are illustrative views showing how the coil transfer device, incorporated in the weaving machine of the third modified form, performs a coil transfer operation in various steps.

DETAILED DESCRIPTION OF PREFERRED EMBODIMENTS

Now, a weaving machine of various embodiments according to the present invention will be described below in detail with reference to the accompanying drawings. However, the present invention is construed not to be limited to such embodiments described below and technical concepts of the present invention may be implemented in combination with other known technologies or the other technology having functions equivalent to such known technologies.

In the following description, it is to be understood that such terms as "central", "radially", "axially", "circumferential", "side", "above", "lower", "downward", "distal", "end", "upper end", "lower end", "distal end", "vertical" and the like are words of convenience and are not to be construed as limiting terms.

[Embodiment]

Hereunder, a weaving machine for a rotary electric machine coil assembly of one embodiment according to the present invention will be described below in detail with reference to the accompanying drawings.

First, description is given of an outline structure of a stator 10 for a rotary electric machine incorporating a coil assembly 20 manufactured with the use of the weaving machine of one embodiment according to the present invention.

Figure 1A:
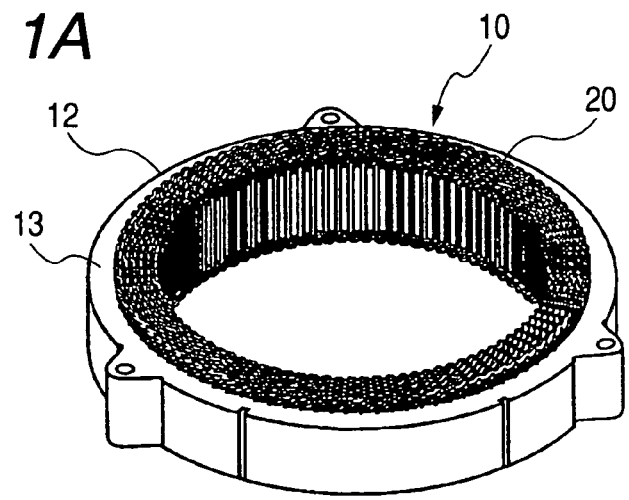
FIG. 1A is a perspective view showing an outer profile of a stator of a rotary electric machine incorporating a coil assembly manufactured with a weaving machine of one embodiment according to the present invention.
Figure 1B:
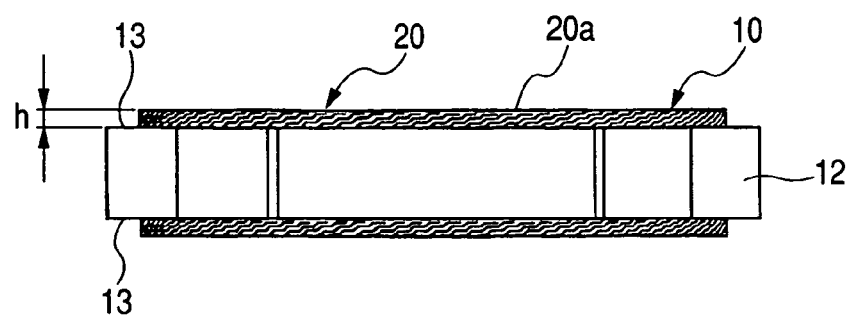
FIG. 1B is a side view of the stator shown in FIG. 1A as viewed the stator at a side area thereof.
Figure 2:
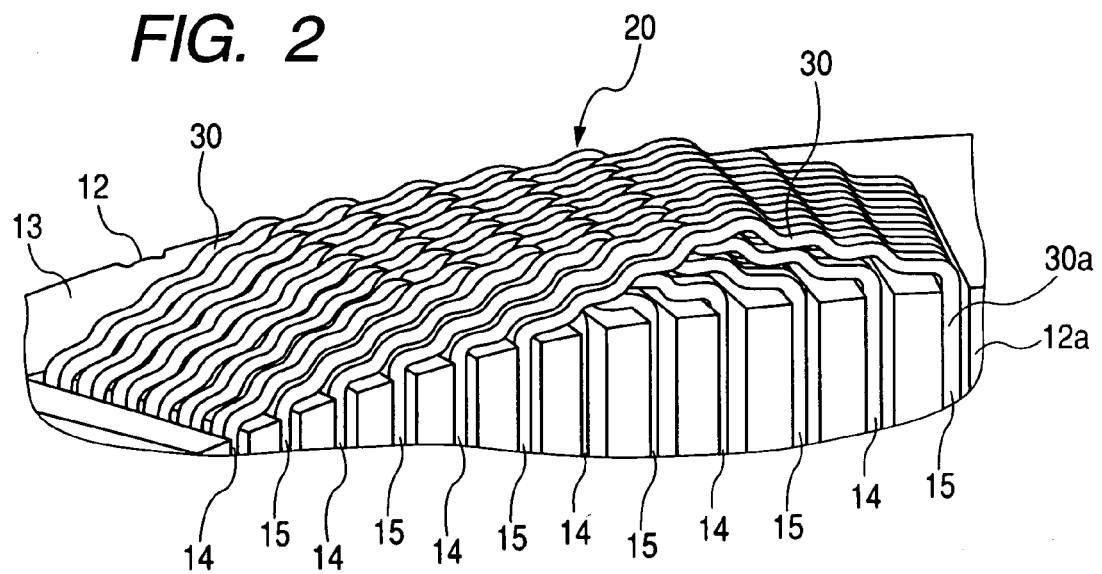
FIG. 2 is a fragmentary perspective view of the stator in an enlarged scale.

FIG. 1A is a perspective view showing an external appearance of the stator 10 for the rotary electric machine to which the coil assembly 20, manufactured with the use of the weaving machine of one embodiment according to the present invention, is applied. FIG. 1B is a side view of the stator 10 as viewed on a side thereof. FIG. 2 is a fragmentary perspective view showing a part of the stator 10 in an enlarged scale.

As shown in FIGS. 1A and 1B, the stator 10 is employed in a rotary electric machine having functions of, for instance, a vehicular electric motor and an electric power generator in combination. The stator 10 has an inner circumferential periphery in which a rotor (not shown) is rotatably supported in a radially face-to-face relation. The rotor has an outer circumferential periphery carrying thereon a plurality of magnetic pole pieces composed of permanent magnets with different polarities alternately placed along a circumferential direction of the rotor such that the magnetic pole pieces face the inner circumferential periphery of the stator 10.

The stator 10 includes a stator core 12 composed of a plurality of magnetic steel plates, each having a given thickness, which are stacked one another to form an annular configuration extending in an axial direction. As shown in FIG. 2, the stator core 12 has the inner circumferential periphery 12a formed with a plurality of sets of slots 14 and 15 provided at circumferentially spaced positions. The coil assembly 20, incorporating stator windings, takes the form of three phase weavings each of which includes plural sets of slots 14 and 15 circumferentially adjacent to each other. The stator windings for different phases are accommodated in three sets of slots 14 and placed circumferentially adjacent to each other with one set being composed of the slots 14 and 15.

Figure 3:
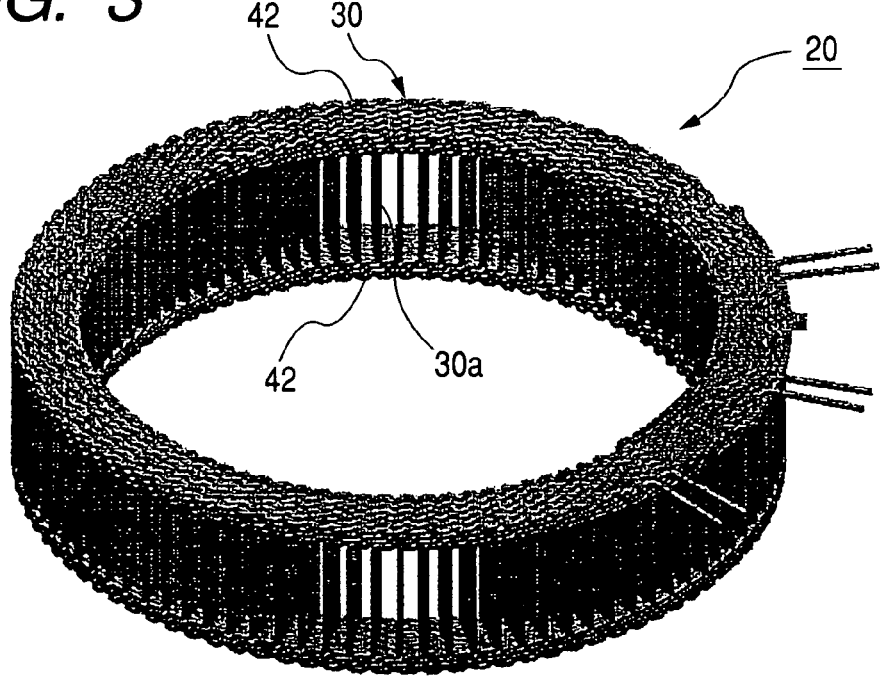
FIG. 3 is a perspective view of a coil assembly incorporated in the stator shown in FIGS. 1A and 1B.
Figure 4:
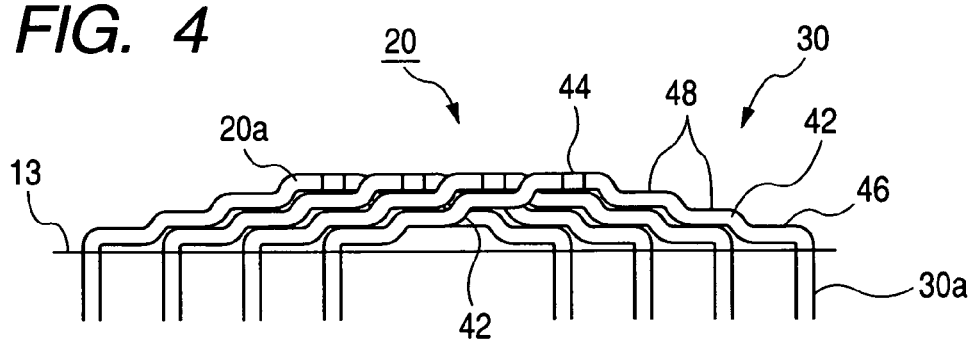
FIG. 4 is a fragmentary front view showing coil end portions of the coil assembly incorporated in the stator shown in FIGS. 1A and 1B.
Figure 5:
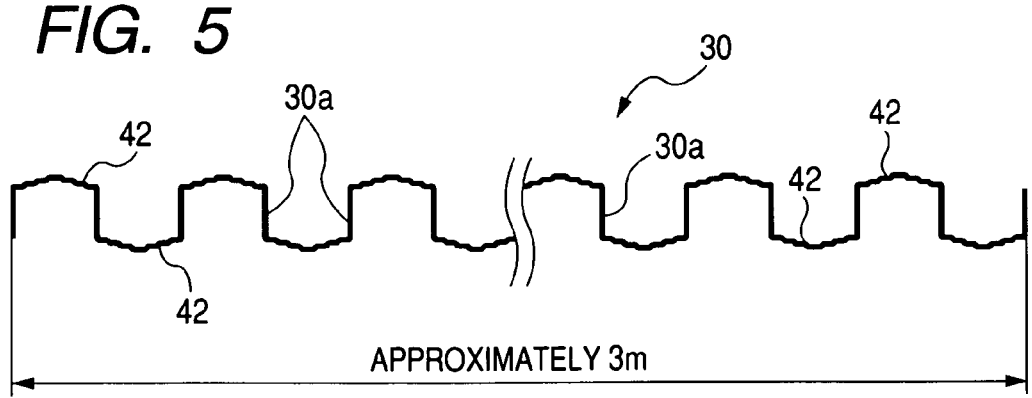
FIG. 5 is a front view showing a whole shape of a coil wire segment used for the coil assembly incorporated in the stator shown in FIGS. 1A and 1B.
Figure 6A:
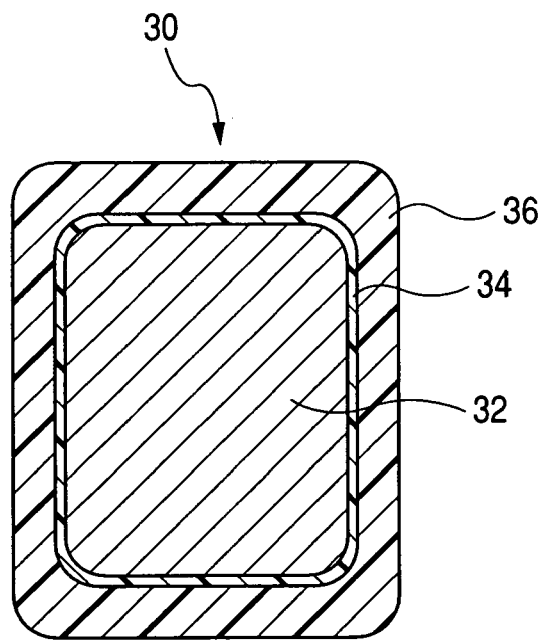
FIGS. 6A and 6B are cross-sectional views showing the coil wire segment used for the coil assembly incorporated in the stator shown in FIGS. 1A and 1B.
Figure 6B:
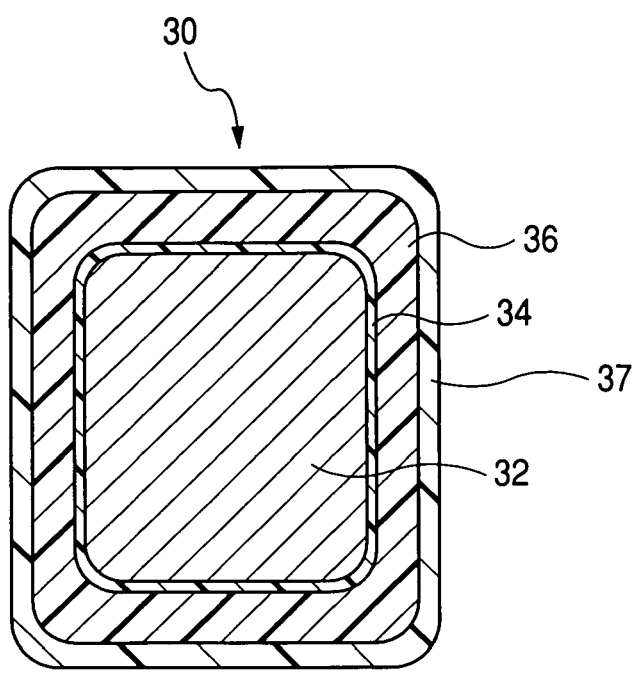
Figure 7:
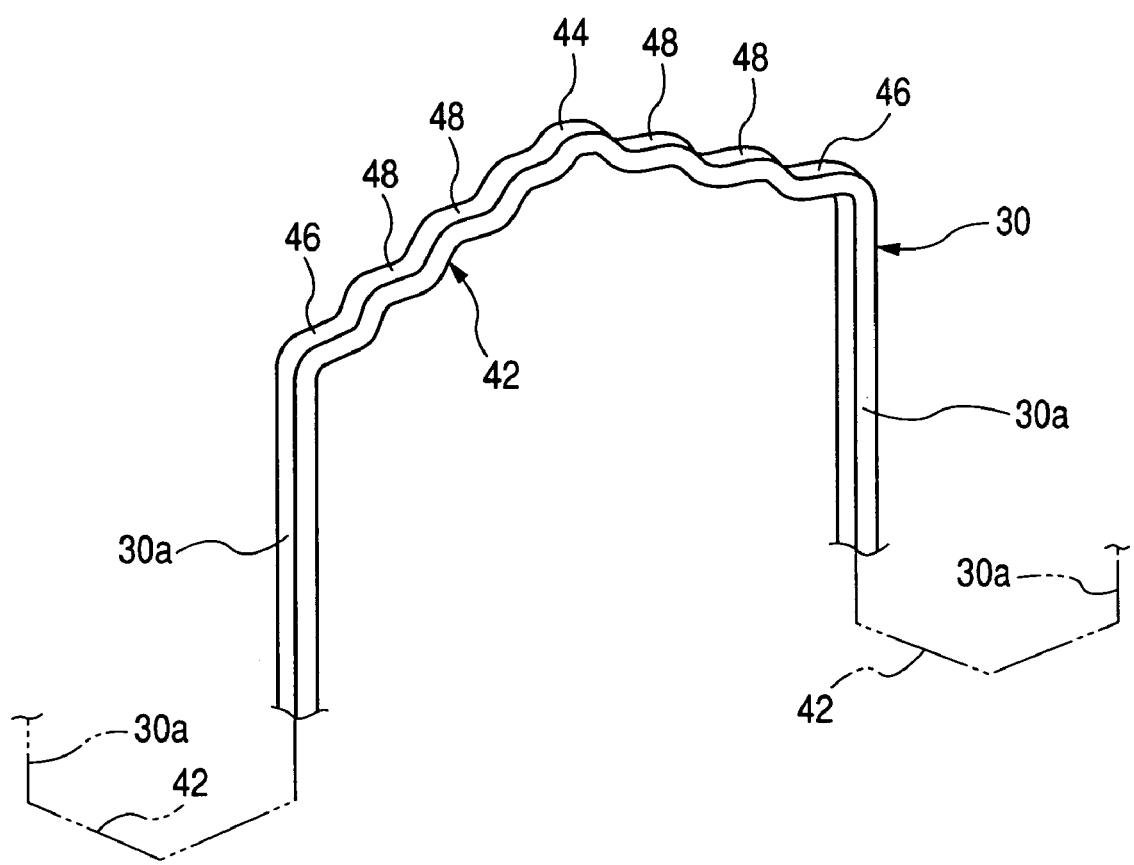
FIG. 7 is a perspective view showing a profile of a turn portion of the coil wire segment used for the coil assembly incorporated in the stator shown in FIGS. 1A and 1B.

Next, a structure of the coil assembly 20 is described below. FIG. 3 is a perspective view showing an external appearance of the coil assembly 20. FIG. 4 is a fragmentary front view showing coil end portions 20a of the coil assembly 20 and FIG. 5 is a front view showing an overall shape of a coil wire segment 30. FIGS. 6A and 6B are cross sectional views of the coil wire segment 30 and FIG. 7 is a perspective view showing a shape of a turn portion 42 of the coil wire segment 30.

As shown in FIG. 5, the coil wire segment 30 of the coil assembly 20 is comprised of a plurality of in-slot portions 30a spaced at equal intervals in parallel to each other and a plurality of turn portions 42 extending between adjacent in-slot portions 30a at alternately opposite ends thereof. The coil wire segment 30 of the coil assembly 20 is made of a single rod with a length of approximately 3 m. As shown in FIGS. 6A and 6B, further, the coil wire segment 30 is comprised of a conductive body 32, made of steel, and an insulation sheath composed of an inner insulation layer 34 covering an outer circumference of the conductive body 32 for electrical insulation and an outer insulation layer 36 covered on the inner insulation layer 34.

The inner insulation layer 34 covers the outer circumference of the conductive body 32 and the outer insulation layer covers an outer periphery of the inner insulation layer 34. The insulation sheath, involving the inner and outer insulation layers 34 and 36, has a total thickness determined in a value ranging from 100 μm to 200 μm. Thus, the insulation sheath, composed of the inner and outer insulation layers 34 and 36, has a sufficient thickness that no need arises for an insulation paper sheet or the like to be interposed between the coil wire segments 30 for providing electrically insulating the coil wire segments 30 from each other.

The outer insulation layer 36 is made of insulation material such as Nylon or the like and the inner insulation layer 34 is made of another insulation material such as thermoplastic resin, having a higher glass transition temperature than that of the outer insulation layer 36, or polyamide-imide resin or the like having no glass transition temperature. With such a structure, the outer insulation layer 36 is softened faster than the inner insulation layer 34 due to heat arising during the operation of the rotary electric machine. Therefore, the coil wire segments 30, placed in the same slot 14, are thermally bonded to each other at the outer insulation layers 36. As a result, the plural coil wire segments 30, placed in the same slot 14, are unitized in structure to allow the coil wire segments 30 to be formed in a rigid-body structure. This allows the plural coil wire segments 30, placed in the same slot 14, to have increased mechanical strength. In addition, even if the rotary electric machine encounters vibration in excess, a bonding area between the inner and outer insulation layers 34 and 36 are peeled off from each other faster than that of a bonding area between the inner insulation layer 34 and the conductive body 32. This permits the inner insulation layer 34 and the conductive body 32 to remain in a bonding state with a reliable insulating effect.

As shown in FIGS. 2, 4 and 5, the coil wire segments 30 include the in-slot slot portions 30a that are disposed in the slots 14 and 15 of the stator core 12. The turn portions 42 protrude from the slots 14 and 15 in areas axially outside of the stator core 12 and extend between the in-slot portions 30a and 30a placed in the slots 14 and 15 circumferentially spaced from each other. Thus, the coil wire segments 30 are supported with the stator core 12 in wave winding, thereby forming a stator windings (coil assembly) 20. The turn portions 42 are formed in the areas near both axial ends of the stator coil 12 at circumferentially adjacent positions, respectively.

As shown in FIG. 7, each turn portion 42 has a nearly central area formed with a central cranked portion 44 formed in a non-twisting state. The central cranked portion 44 is formed in a cranked shape extending along an end face 13 of the stator core 12 (see FIG. 4). The central cranked portion 44 is displaced, caused by the presence of the cranked shape, by a value nearly equivalent to a width of the coil wire segment 30. This allows the coil wire segments 30, radially placed adjacent to each other, to be densely wounded. As a result, the coil end has a small radial width, thereby preventing the coil assembly 20 from jutting radially outward of the stator core 12.

As shown in FIGS. 2, 4 and 7, further, the turn portion 42 has protruding areas, protruding axially outward from the relevant slots 14 and 15, which have side cranked portions 46 extending from the in-slot portions 30a at areas axially outward of the slots 14 and 15 in close proximity to the end face 13 of the stator core 12, respectively, and connected to each other via the central cranked portion 44. With such a structure, the turn portion 42 of the coil wire segment 30 protrudes from the slots 14 and 15 by an interval, spaced from the end face 13, which is narrower than a distance between the relevant slots which the soil wire segment 30 straddles. As a result, the coil end of the coil assembly 20 has a reduced axial height "h".

Furthermore, assuming each cranked portion 46 extending along the end face 13 of the stator core 12 has a length of "d1" and a distance between the circumferentially adjacent slots is "d2", the relationship is expressed as $d1 \leq d2$. This effectively prevents the cranked portion 46 of one coil wire segment 30, having the in-slot portions 40 accommodated in one pair of slots, from conflicting with the other coil wire segment 30 extending from the circumferentially neighboring slot. This avoids the coil wire segments 30, protruding from the circumferentially neighboring slots, from conflicting with each other. This prevents an increase in axial height of the coil end or an increase in width of the coil end in a radial direction. As a result, the coil end can be lowered in height. In addition, the coil end can have a decreased width in the radial direction, thereby precluding the coil assembly 20 from jutting radially outward of the stator core 12.

Moreover, the coil wire segment 30 has two intermediate cranked portions 48 formed between the central cranked portion 44, placed at the nearly central area of the turn portion 42, and each of the side cranked portions 46 contiguous with the in-slot portions 30a. That is, the coil wire segment 30 has a total of seven cranked portions formed on the turn portion 42 in the areas facing each of the end faces 13 of the stator core 12. This allows the turn portion 42 (i.e., the end portion) of the coil wire segment 30 to have the height "h" that is made lower in axial height than that of a triangular turn portion with no formation of the cranked portions. Like profiles of the cranked portions 44 and 46, the cranked portions 48 have cranked configurations formed in cranked shapes extending along the end face 13 of the stator core 12. Accordingly, the turn portion 42 of the coil wire segment 30 has both sides formed in stepped configurations with respect to the central cranked portion 44.

With the coil assembly 20 formed in die three-phase stator windings, the coil wire segments 30 for each phase per one pole of the rotor are accommodated in the two slots 14 and 15 (see FIG. 2). That is, the stator core 12 has a total number of six slots (i.e., 3×2=6) per one pole of the rotor for the coil assembly 20 having the in-slot portions 30a consecutively placed in the slots circumferentially adjacent to each other. As a result, the coil wire segments 30, straddling the circumferentially different slots, are accommodated in the slots circumferentially spaced by six slots. Thus, each of the coil wire segments 30 may preferably include the turn portion 42 provided with (3×2+1=7) pieces of the cranked portions, involving the central cranked portion 44 placed at the nearly central position of each coil wire segment 30. This avoids the occurrence of interference among the coil wire segments 30 protruding from the circumferentially adjacent slots. With the provision of the seven cranked portions on the coil wire segment 30 at the coil end axially facing the end face 13 of the stator coil 12, the coil end of the coil wire segment 30 has a reduced axial height, thereby enabling the coil end to have a reduced radial width.

Next, further description is made of the weaving machine for manufacturing the rotary electric machine coil assembly using the two coil wire segments 30.

Figure 8:
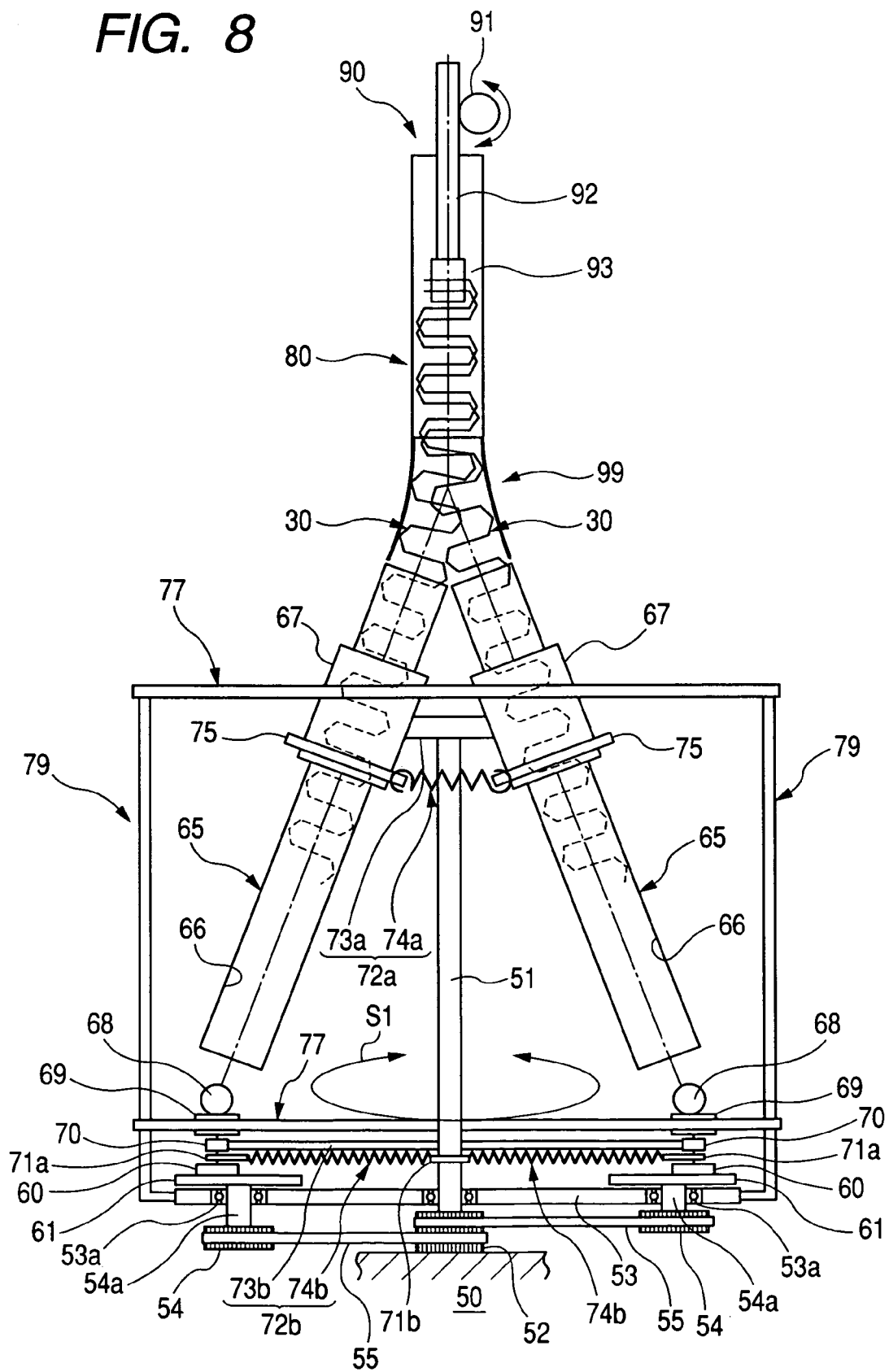
FIG. 8 is a front view of the weaving machine of the present embodiment to be used for manufacturing the coil assembly for a rotary electric machine.

FIG. 8 is a front view of the weaving machine of one embodiment according to the present invention with the coil assembly for the rotary electric machine being typically shown.

As shown in FIG. 8, the weaving machine WM of the present embodiment is comprised of: a rotating and driving section RD composed of a stationary pulley 52, a rotary table (rotary member) 53, two rotary pulleys 54 and 54, two timing belts (drive power transmitting members) 55 and 55, and a drive motor (not shown); two movable members 60 and 60; bifurcated coil feed magazines 65 and 65; two orbit specifying members 72a and 72b; two rotation synchronizing members 77 and 77; a woven coil magazine 80; a coil transfer device 90; and a coil guide 99.

The weaving machine WD has a base 50 on which a shaft column 51 stands upright. The shaft column 51 has a root portion 51a, extending upward from the base 50, to which the stationary pulley 52 of the rotating and driving section RD is coaxially fixed. The rotary table 53 is placed in an area above the stationary pulley 52 to be rotatable about a center axis of the shaft column 51 via a bearing 53b. The rotary table 53 is rotatable about the center axis of the shaft column 51 in a direction S1 on a plane parallel to a horizontal direction. The rotary table 53 has opposite areas (at positions symmetric with each other with respect to an axis), between which the center axis of the rotary table 53 is pinched, which rotatably supports shaft members 54a and 54a via bearings 53a and 53a mounted in the rotary table 53.

The shaft members 54a and 54a have lower ends, protruding downward from the rotary table 53, which have protruding distal ends on which the rotary pulleys 54 and 54 are rotatably mounted in coaxial relationships. The rotary pulleys 54 and 54 have outer circumferential peripheries having the same number of teeth as that of teeth formed on the stationary pulley 52 at an outer circumferential periphery thereof. Moreover, the turning belts 55 and 55 are tensioned between the rotary pulleys 54 and 54 and the stationary pulley 52 to be rotatably driven with a drive motor (not shown). As the timing pulleys 55 and 55 are drivably operated, the rotary pulleys 54 and 54 rotate on their axes and revolve about the center axis of the stationary pulley 52 under the same attitudes In this moment, the rotary table 53 is arranged to rotate about the center axis of the shaft column 51. When this takes place, the rotary pulleys 54 and 54 rotate about their axes one turn and the rotary pulleys 54 and 54 move one turn about the center axis of the stationary pulley 52, thereby sustaining the same attitudes.

Figure 9:
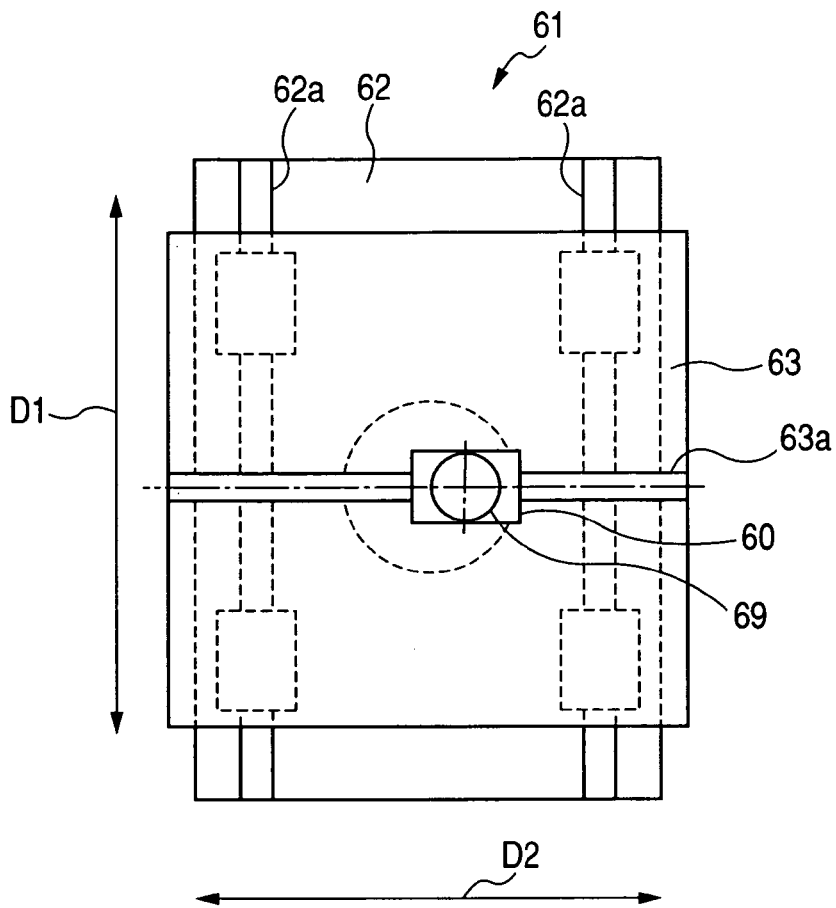
FIG. 9 is a plan view showing an XY table forming part of the weaving machine of the present embodiment shown in FIG. 8.
Figure 10:
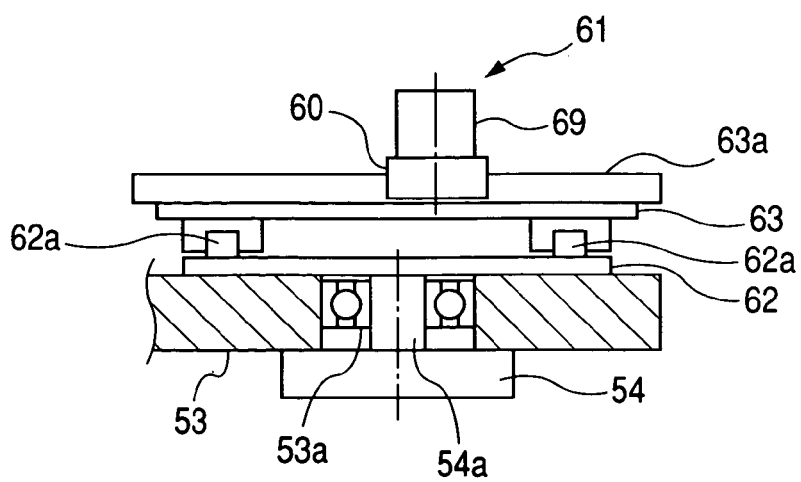
FIG. 10 is a side view of the XY table shown in FIG. 9 as viewed in an X-direction.

The shaft members 54a and 54a have axial upper end faces on which XY movable tables 61 and 61 are fixedly mounted to carry the movable members 60 and 60, respectively. As shown in FIGS. 9 and 10, each of the XY movable tables 61 and 61 includes: an X-table 62 having two X-rails 62a and 62a extending in an X-direction in parallel to each other and mounted on the shaft member 54a (at a lower end carrying the rotary pulley 54) such that the X-table 62 is movable in an X-direction D1; and a Y-table 63 having a single Y-rail 63a extending in a Y-direction to be movable in the X-direction on a linear motion-guide system. In addition, an angle between the X-rail 62a and the Y-rail 63a is 90 degrees.

The movable members 60 and 60 are mounted on the Y-rails 63a of the Y-tables 63, respectively, to be movable in the Y-direction D2 on the linear motion-guide system. This makes it possible to freely move the Y-table 63 in the X- and Y-directions D1 and D2 on a plane perpendicular to a rotation axis of the rotary table 53.

Figure 11:
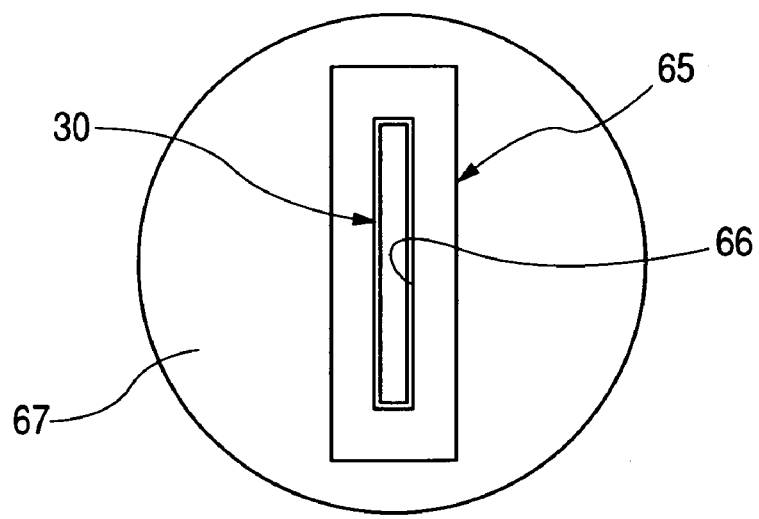
FIG. 11 is a side view of a coil feed magazine, forming part of the weaving machine of the present embodiment shown in FIG. 8, as viewed in an axis of the coil feed magazine.

As shown in FIG. 11, the coil feed magazines 65 and 65 take the from of structures formed in rectangular cylinder shapes, each having an outer profile formed in a rectangular shape in cross section and extending in a linear configuration, which are internally formed with first transfer passages 66 and 66 through which the coil wire segments 30 are transferred. Each of the first transfer passages 66 and 66 has a rectangular shape in cross section with a size slightly larger in width and thickness than the coil wire member 30 to be delivered. The first transfer passages 66 and 66 have axes coaxially aligned with the axes of the coil feed magazines 65 and 65, respectively.

Figure 13:
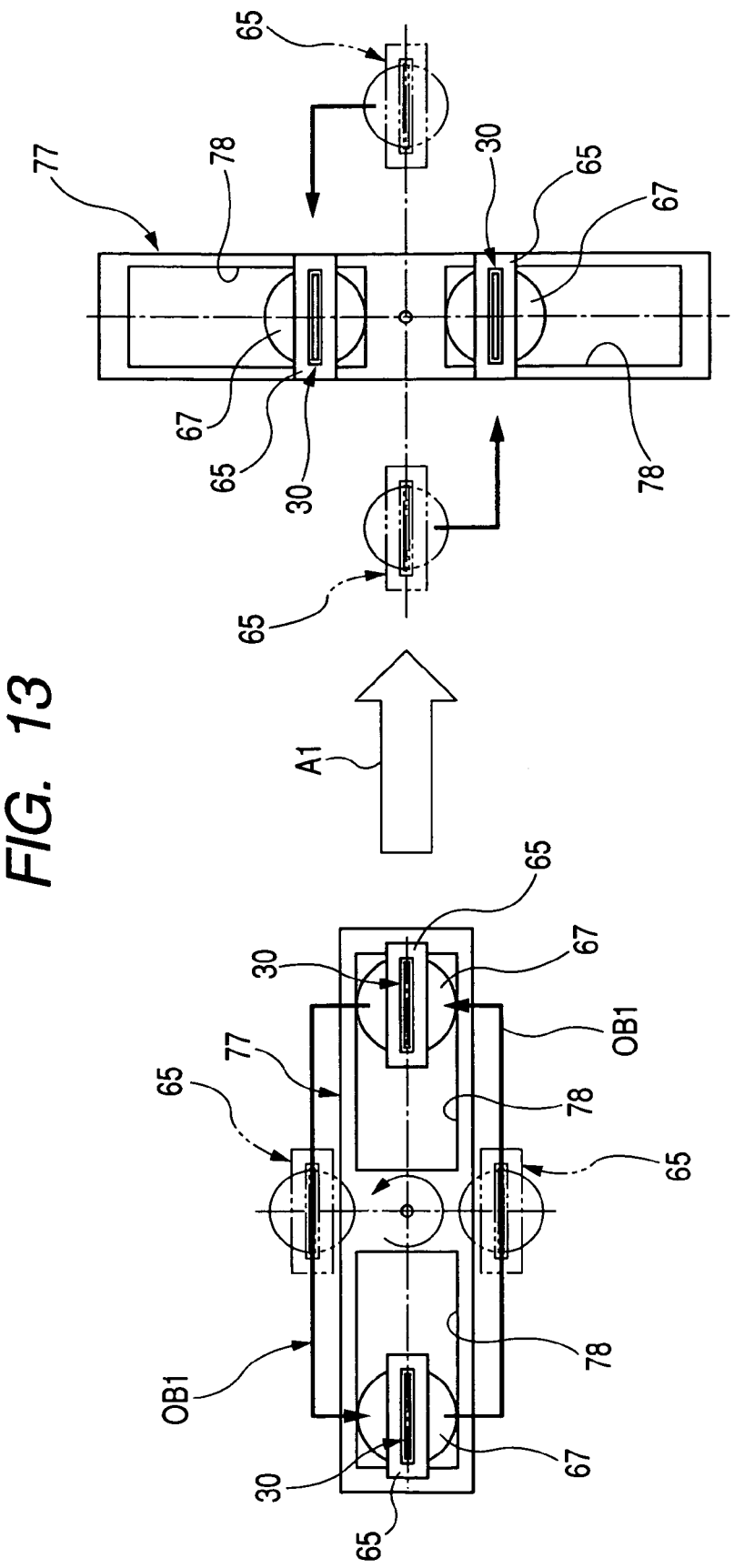
FIG. 13 is an illustrative view of showing movement patterns to be achieved with the coil feed magazine held with a rotation synchronizing member forming part of the weaving machine of the present embodiment shown in FIG. 8.

The first transfer passages 66 and 66 have channel surfaces each coated with material such as, for instance, resin having a low friction coefficient with minimized frictional resistance, thereby making it possible to smoothly transfer the coil wire segments 30 and 30, respectively. Further, the first transfer passages 66 and 66 are formed in linear shapes, respectively, thereby facilitating smooth transfers of the coil wire segments 30 and 30, respectively. This avoids the coil wire segments 30 and 30 from deforming during the transfers thereof. In addition, as shown in FIG. 13, the coil feed magazines 65 and 65 have upper end portions to which abutment members 67 and 67 are mounted, respectively, in areas where the abutment members 67 and 67 are inserted to and held in elongated slots 78 and 78 of the upper rotation synchronizing members 77 and 77 at upper ends of the coil feed magazines 65 and 65, respectively.

Further, the coil feed magazines 65 and 65 have ends (lower ends) connected to and supported with the movable members 60 and 60 via pivots 68 and 68 and guide shafts 69 and 69, respectively. Furthermore, the coil feed magazines 65 and 65 are placed under inclined conditions with respect to each other so as to allow the coil wire segments 30, transferred through the first transfer passages 66 and 66 to the other ends (upper ends), to have axes crossing each other on the rotation axis of the rotary table 53.

In particular, the coil feed magazines 65 and 65 have the lower ends connected to the pivots 68 and 68 through which the coil feed magazines 65 and 65 are made to be swingable with respect to the guide shafts 69 and 69 (with the movable members 60 and 60) in a range of 360 degrees. In addition, the guide shafts 69 and 69 (with the movable members 60 and 60) are located on the XY tables 61 and 61. With such structures, an inclining angle between the coil feed magazines 65 and 65 is made variable. Moreover, the coil feed magazines 65 and 65 are arranged in structure such that the coil feed magazines 65 and 65 take initial states under which a phase angle difference between the coil wire segments 30, transferred through the first transfer passages 66 and 66, lies at an angle of zero degree.

As shown in FIG. 8, the orbit specifying members 72a and 72b, placed at two locations on both longitudinal ends of the coil feed magazines 65 and 65, allow the coil feed magazines 65 and 65 to rotate about the rotation axis of the rotary table 53 in a specified nearly rectangular or oblong orbit. The orbit specifying members 72a and 72b are located at the two positions, i.e., at the upper ends and the root portions of the coil feed magazines 65 and 65 and include templates 73a and 73b having outer circumferential walls each formed in a nearly rectangular or oblong shape. The coil springs (spring members) 74a and 74b urge the coil feed magazines 65 and 65 against the outer circumferential edge portions of the templates 73a and 73b.

The templates 73a and 73b are mounted on the shaft column 51 at two positions, i.e., at an upper end portion and a root portion thereof, so as to have the centers aligned with the center axis of the shaft column 51. The templates 73a and 73b have outer circumferential profiles formed in nearly rectangular or oblong shapes remaining under a similarity relationship. The template 73a, placed on the coil feed magazines 65 and 65 at both upper ends thereof, is smaller in size than the template 73*b* located on the coil feed magazines 65 and 65 at the root portions thereof.

A pair of coil springs 74*a* (with only one coil spring being shown in FIG. 8), tensioned between the coil feed magazines 65 and 65 at the upper end portions thereof, has both ends hooked to retainer rings 75 and 75 mounted on the abutment members 67 and 67 at outer peripheries thereof to be slidable in circumferential directions, respectively, and placed on both sides of the shaft column 51. With such a pair of coil springs 74*a* arranged to urge the upper end portions of the coil feed magazines 65 and 65 toward the center axis (i.e., the rotation axis of the rotary table 53) of the shaft column 51, the outer circumferential peripheries of the abutment members 67 and 67 are sustained under states pressed against an outer circumferential edge portion of the template 73*a*.

Figure 12:
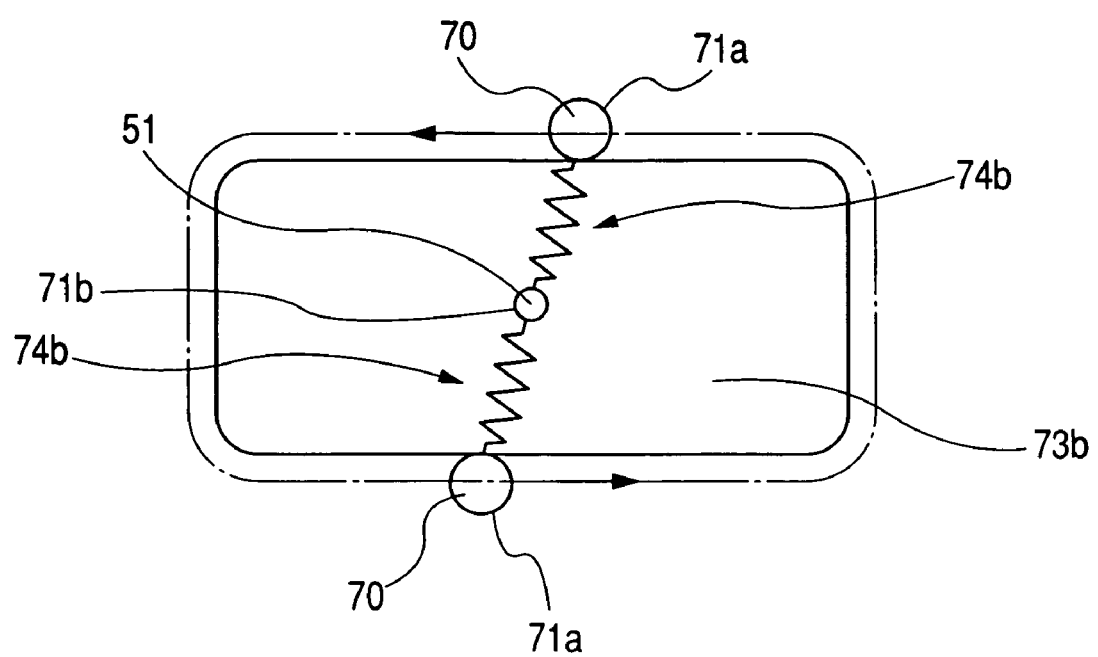
FIG. 12 is an illustrative view of an orbit specifying member forming part of the weaving machine of the present embodiment shown in FIG. 8.

Meanwhile, a pair of coil springs 74*b* and 74*b*, located on the coil feed magazines 65 and 65 at the root portions thereof, have both ends hooked to retainer rings 71*a* and 71*a* mounted on the guide shafts 69 and 69 at outer peripheries thereof to be slidable in circumferential directions, respectively. The other ends are connected to a retainer ring 71*b* mounted on the shaft column 51 at an outer periphery thereof to be slidably movable in a circumferential direction as shown in FIGS. 8 and 12. With such a pair of coil springs 74*b* and 74*b* arranged to urge the lower end portions of the coil feed magazines 65 and 65 toward the center axis (i.e., the rotation axis of the rotary table 53) of the shaft column 51, rollers 70 and 70, provided on the guide shafts 69 and 69 at intermediate portions thereof, are sustained under states pressed against an outer circumferential edge portion of the template 73*b*.

Thus, with the urging forces urged by the coil springs 74*a* and 74*b*, the coil feed magazines 65 and 65 are pressed against the outer circumferential edge portions of the templates 73*a* and 73*b* at all times, respectively. This allows the rotary table 53 to rotate about the center of the rotation axis (the rotation axis of the stationary pulley 52) in a manner so as to describe a nearly rectangular or oblong orbit along the outer circumferential peripheries of the templates 73*a* and 73*b*.

With the rotation synchronizing members 77 and 77 placed in the two positions of the coil feed magazines 65 and 65 at the longitudinal both ends thereof, further, the coil feed magazines 65 and 65 are caused to rotate in synchronizing motions during the rotating movements of the rotary pulleys 54 and 54 (in rotating about their axes and rotating around the shaft column 51). The rotation synchronizing members 77 and 77, having their centers located on the rotation axis of the rotary table 53, have both longitudinal end portions fixed to a pair of support columns 79 and 79 standing upright in areas (at positions symmetric with respect to the axis) opposite to each other with the rotation axis of the rotary table 53 intervening between the pair of support columns 79 and 79.

As shown in FIGS. 8 and 13, the rotation synchronizing members 77 and 77, made of rigid material and formed in elongated rectangular plate-like shapes, respectively, are formed with a pair of elongated slots 78 and 78 on both sides in a longitudinal direction. The elongated slots 78 and 78 accommodate therein the guide shafts 69 and 69 (or the abutment members 67 and 67) under inserted and supported states. In addition, the elongated slots 78 and 78 extend through the rotation synchronizing members 77 and 77, respectively, in thickness directions thereof and are formed in elongated shapes, respectively. The elongated slots 78 and 78 have widths slightly greater than outer diametric dimensions of the guide shafts 69 and 69 (or the abutment members 67 and 67).

With such structures mentioned above, the coil feed magazines 65 and 65 are made movable within the elongated slots 78 and 78 in the longitudinal directions thereof. Moreover, during a phase in which the coil feed magazines 65 and 65 are caused to rotate about the rotation axis of the rotary table 53, the rotation synchronizing members 77 and 77 sustain the coil feed magazines 65 and 65 in intervals at equivalent angles (of 180 degrees with the present embodiment). In addition, the elongated slots 78 and 78 are formed in adequately long length to avoid interference with the movements of the coil feed magazines 65 and 65, inserted to and retained with the elongated slots 78 and 78, during the rotation about the rotation axis of the rotary table 53 describing the nearly rectangular or oblong orbit.

As shown in FIG. 13, the rotation synchronizing members 77 and 77 cause the coil feed magazines 65 and 65 to move along orbits OB1 of the coil feed magazines 65 and 65. As the rotation synchronizing member 77 rotates by an angle of 90° as indicated by a whitened arrow A1, the rotation synchronizing member 77 assumes a position on right side of FIG. 13.

Figure 14:
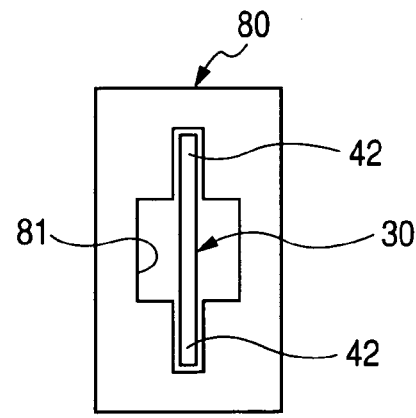
FIG. 14 is a side view of a woven coil magazine, forming part of the weaving machine of the present embodiment, as viewed in an axis of the woven coil magazine.

As shown in FIG. 8, the woven coil magazine 80 is located in an area near the outlets of the coil feed magazines 65 and 65 at a position displaced therefrom by a given distance. As shown in FIG. 14, the woven coil magazine 80 has an outer profile formed in a rectangular shape in cross section and has a rectangular cylindrical configuration extending in a linear shape. The woven coil magazine 80 is internally formed with a second transfer passage 81 that permits the transfers of the woven coil wire segments 30 and 30 under states with the turn portions 42 and 42 crossing each other.

The second transfer passage 81 has a cross-sectional shape formed in size such that a scrubber 93 (described below) of the coil transfer device 90, gripping the woven coil wire segments 30 and 30, passes through the second transfer passage 81. The second transfer passage 81 extends in the same linear shape as those of the first transfer passages 66 and 66. In addition, the second transfer passage 81 has a transfer surface with reduced frictional contact. The second transfer passage 81 is also formed on the same axis as that of the woven coil magazine 80.

Figure 15A:
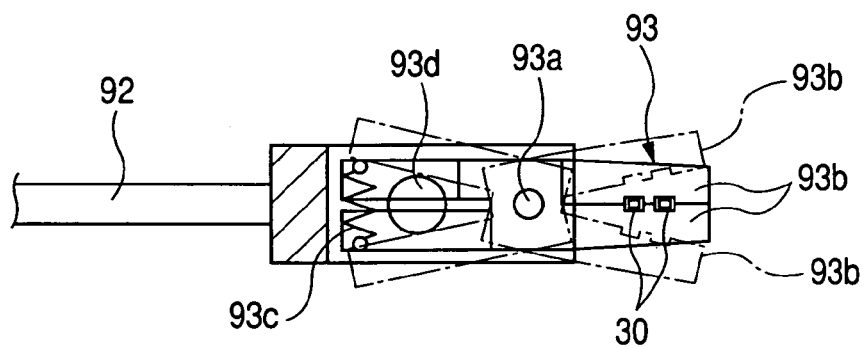
FIG. 15A is a schematic view showing a clamper of a coil transfer device forming part of the weaving machine of the present embodiment shown in FIG. 8.
Figure 15B:
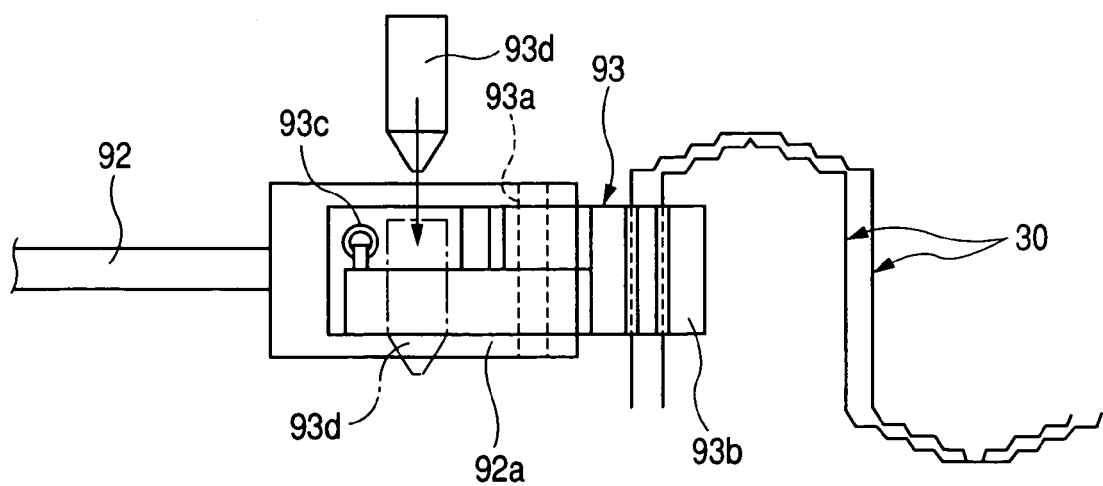
FIG. 15B is a side view of the clamper shown in FIG. 15A.

As shown in FIG. 8 and FIGS. 15A and 15B, the coil transfer device 90 takes the form of a structure including a coil takeout bar 92 having one side surface formed with a plurality of rack teeth (not shown), a clamper 93 provided on the coil takeout bar 92 at a distal end thereof, a pinion 91 held in meshing engagement with the rack teeth of the coil takeout bar 92, and a drive motor (not shown) for rotatably driving the pinion 91 in both directions.

The coil takeout bar 92 has a distal end inserted to and held in the second transfer passage 81 to be movable therein. The coil takeout bar 92 is arranged in structure to be movable in a vertical direction along the second transfer passage 81 when the pinion 91 is drivably caused to rotate. As shown in FIGS. 15A and 15B, the coil takeout bar 92 has one cad formed with bifurcated portions 92*a*. The clamper 93 has a pivot shaft 93*a* having both ends supported with the bifurcated portions 92*a*, a pair of claws 93*b* and 93*b* swingably mounted on the pivot shaft 93*a* to be swingably movable about a center axis thereof to grip the woven coil wire segments 30 and 30, spring members 93*c* for urging the pair of claws 93*b* and 93*b* in a direction to be closed (in a gripping state), and a clamper opening pin 93*d* inserted between the pair of claws 93*b* and 93*b* to cause same to be opened (under a non-gripping state).

With the coil transfer device 90 of such a structure, it is arranged such that the clamper 93 clamps end portions of the woven coil wire segments 30 and 30 placed under the state with the turn portions 42 and 42 crossing each other to permit the woven coil wire segments 30 and 30 to be transferred from the inlet of the second transfer passage 81 to the outlet thereof.

As shown in FIG. 8, the coil guide 99 is formed in a cylindrical shape with one end (upper end) smaller in diameter than the other end (lower end) and disposed between the coil feed magazines 65 and 65 and the woven coil feed magazine 80. The coil guide 99 guides the coil wire segments 30 and 30, transferred from the outlets of the first transfer passages 66 and 66, to the inlet of the second transfer passage 81 via a weaving section (placed at a position with axes of the coil wire segments 30 and 30 crossing each other).

When manufacturing a coil assembly of a rotary electric machine with the use of the weaving machine of the present embodiment with such a structure mentioned above, two coil wire segments 30 and 30, each formed with the plurality of turn portions, are set for preparation to be inserted to the weaving machine in a manner described below.

First, the coil wire segments 30 and 30 are inserted to the inlets of the first transfer passages 66 and 66 of the coil feed magazines 65 and 65, respectively. Then, the turn portions 42 and 42 of the coil wire segments 30 and 30 are extracted from the outlets of the first transfer passages 66 and 66 to cross each other within the coil guide 99. Thereafter, the coil transfer device 90 is actuated causing the clamper 93 to grip the end portions of the coil wire segments 30 and 30 in an area near the inlet of the second transfer passage 81 of the woven coil feed magazine 80 with the turn portions 42 and 42 remaining under woven states in crossing fashion (see FIGS. 15A and 15B), thereby establishing a ready state.

Further, the angle (i.e., an angle θ between the axes of the coil wire segments 30 and 30) between the axes of both the coil feed magazines 65 and 65 is initially set to a value that is suitably adjusted within a range from 10 degrees to 90 degrees depending on sizes of the coil wire segments 30 and 30 to be used. In addition, the coil feed magazines 65 and 65 remain halted in a state to allow the coil wire segments 30 and 30, placed in the first transfer passages 66 and 66, respectively, to establish the same phases.

With the beginning in operation of the weaving machine under such states mentioned above, the drive motor of the coil transfer device 90 is driven to rotate the pinion 91 such that the coil takeout bar 92 and the clamper 93 move from the inlet of the second transfer device 81 to the outlet thereof so as to be extracted. This causes the end portions of the woven coil wire segment 30 and 30, gripped with the clamper 93, to move to the outlet of the second transfer passage 81 to be extracted therefrom such that wholes of succeeding coil wire segments 30 and 30, continuous with the woven coil wire segments 30 and 30, are transferred at given speeds.

At the same time, as the drive motor of the rotating and driving section is turned on, the timing belts 55 and 55 are operated such that the rotary pulleys 54 and 54 rotate on their axes and rotate about the axis of the stationary pulley 52 under the same attitude. During such operations, the rotary table 53 rotates about the center of the shaft column 51 (about the axis of the stationary pulley 52). When this takes place, the movable tables 61 and 61, mounted on the shaft members 54a and 54a of the respective rotary pulleys 54 and 54, respectively, and the coil feed magazines 65 and 65, having the lower ends supported with the movable members 60 and 60 and the pivots 68 and 68, rotate about their axes together with the rotary pulleys 54 and 54 under the same attitude while rotating about the axis of the stationary pulley 52.

Figure 16:
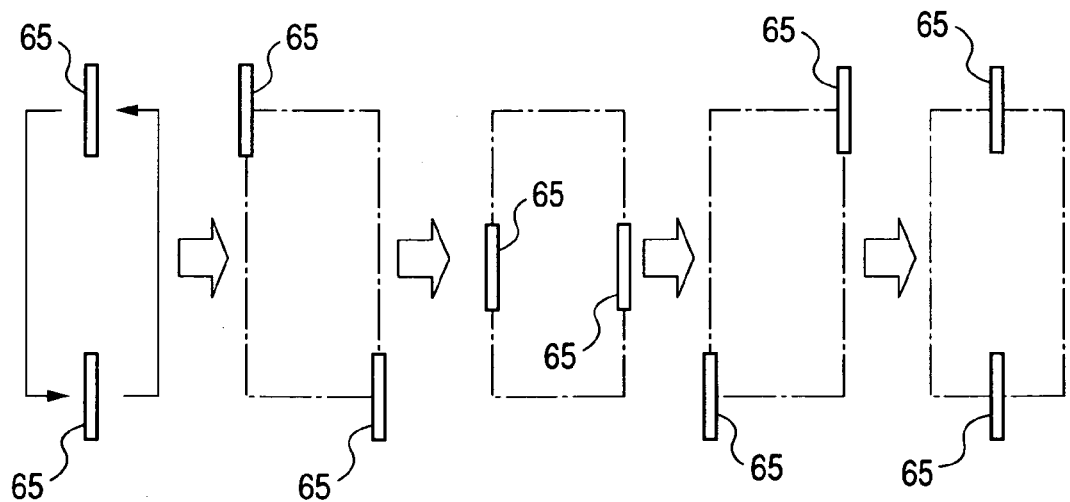
FIG. 16 is an illustrative view showing how the coil feed magazine is caused to move during a coil weaving operation executed in the weaving machine of the present embodiment shown in FIG. 8.

When this takes place, the rotation synchronizing members 75 and 75 rotate in synchronism with each other with the orbit specifying members 72a and 72b specifying the rotation orbits. The coil feed magazines 65 and 65 are caused to rotate so as to describe a nearly rectangular or oblong orbit along the outer circumferential shapes of the templates 71 and 71. That is, as shown in FIG. 16, the coil feed magazines 65 and 65 rotate in synchronism with each other under the same attitude while describing the nearly rectangular or oblong orbit.

With the beginning in operations of the various devices set forth above, therefore, both of the wire segments 30 and 30, delivered in rotating states from the first transfer passages 66 and 66 of the coil feed magazines 65 and 65, pass through the coil guide 99 to be guided to a weaving section (at a position in which the coil wires 30 and 30 cross each other). Both of the wire segments 30 and 30, guided to the weaving section, sequentially cross each other to be continuously woven with no interference between the turn portions 42 and 42. When this takes place, since the wire segments 30 and 30 rotate in synchronism with each other under the same attitude while describing the nearly rectangular or oblong orbit, the relevant turn portions 42 and 42 can be caused to reliably cross each other with no interference between the relevant turn portions 42 and 42. This allows the coil wire segments 30 and 30 to be woven in a reliable and stable manner.

Subsequently, with the turn portions 42 and 42 crossing each other in the woven states, the coil guide 99 guides the woven coil wire segments 30 and 30 to the inlet of the second transfer passage 81 of the woven coil feed magazine 80 from which the woven coil wire segments 30 and 30 are transferred to the outlet of the second transfer passage 81. In such a way, final end portions of the coil wire segments 30 and 30, taken out from the outlets of the first transfer passages 66 and 66, pass through the weaving section to allow all of the turn portions 42 and 42, corresponding to the coil wire segments 30 and 30, to cross each other in a completed state, thereby completing the weaving of the two coil wire segments 30 and 30.

One set of two coil wire segments, woven in such a way mentioned above, woven into one set of four coil wire segments using the weaving machine with a part of the clamper 93 of the coil transfer device 90 being altered depending on needs. Then, the one set of four coil wire segments is woven into one set of eight coil wire segments. With one set of eight coil wire segments woven into the one set of four coil wire segments, one set of twelve coil wire segments are finally woven in a complete state. One set of twelve coil wire segments has end portions bonded to each other at plural areas and a whole of the segments are formed in a doughnut configuration, upon which the coil assembly 20 is completed as shown in FIG. 3.

As set forth above, with the present embodiment, the weaving machine for the coil assembly of the rotary electric machine is arranged in structure to allow the coil wire segments 30 and 30, transferred through the first transfer passages 66 and 66 of the coil feed magazines 65 and 65, to move in synchronism with each other under the same attitude while revolving on the nearly rectangular or oblong orbit. This enables the coil wire segments 30 and 30 to be reliably woven with no interference between the coil wire segments 30 and 30. Especially, when the turn portions 42 and 42 of the coil wire segments 30 and 30 cross each other in an overlapping state, it becomes possible to minimize the angle between the axes of the coil wire segments 30 and 30. This suppresses deformations from occurring on the coil wire segments during the weaving thereof in a further advantageous effect than that achieved when causing the coil wire segments 30 and 30 to revolve on a circular orbit.

With the weaving machine of the present embodiment, the rotary pulleys 54 and 54 and the stationary pulley 52 are arranged to have the same number of teeth, thereby making it possible to allow the rotary pulleys 54 and 54 to rotate one revolution on their axes when the stator pulley 52 to rotate one revolution about the axis thereof such that the rotary pulleys 54 and 54 are reliably sustained in the same attitude. This makes it possible to allow the turn portions 42 and 42 of the coil wire segments 30 and 30 to smoothly and reliably cross each other, thereby ensuring reliability of the weaving while making it possible to realize speeding-up of the weaving.

With the weaving machine of the present embodiment, further, due to the provision of the orbit specifying members 70 and 70 are provided to specify orbital paths of the coil feed magazines 65 and 65 in the nearly rectangular or elongated shapes, the coil feed magazines 65 and 65 can be easily rotated at high speeds, thereby achieving the speeding-up of the weaving. Furthermore, the orbit specifying members 70 and 70 are located at two areas of the coil feed magazines 65 and 65 in longitudinal directions thereof. This makes it possible to allow the coil feed magazines 65 and 65 to rotate along the nearly rectangular or oblong orbits of the templates 71 and 71 in stabled fashions. This results in an effect of enabling the weaving of the oil wire segments 30 and 30 in a stable fashion. In addition, the orbit specifying members 70 and 70 include the coil springs 72 and 72 for urging the coil feed magazines 65 and 65 to be pressed against the outer circumferential peripheries of the templates 71 and 71. This enables the orbital paths of the coil feed magazines 65 and 65 to be specified with high precision.

With the weaving machine of the present embodiment, moreover, due to a layout in which the coil guide 99 is disposed in an area between the coil feed magazines 65 and 65 and the coil magazine 80, the coil guide 99 allows the coil wire segments 30 and 30, transferred from the outlets of the first passages 66 and 66, to be reliably guided to the weaving section (in the position where the coil wire segments 30 and 30 cross each other) with high precision. This makes it possible to allow the turn portions 42 and 42 of the coil wire segments 30 and 30 to reliably cross with high precision, thereby enabling the weaving of the coil wire segments 30 and 30 to be reliably performed with increased precision.

Further, the present invention is not limited to the embodiment set forth above and can be implemented in various modifications made without departing from the scope of the present invention.

[First Modified Form]

Figure 17:
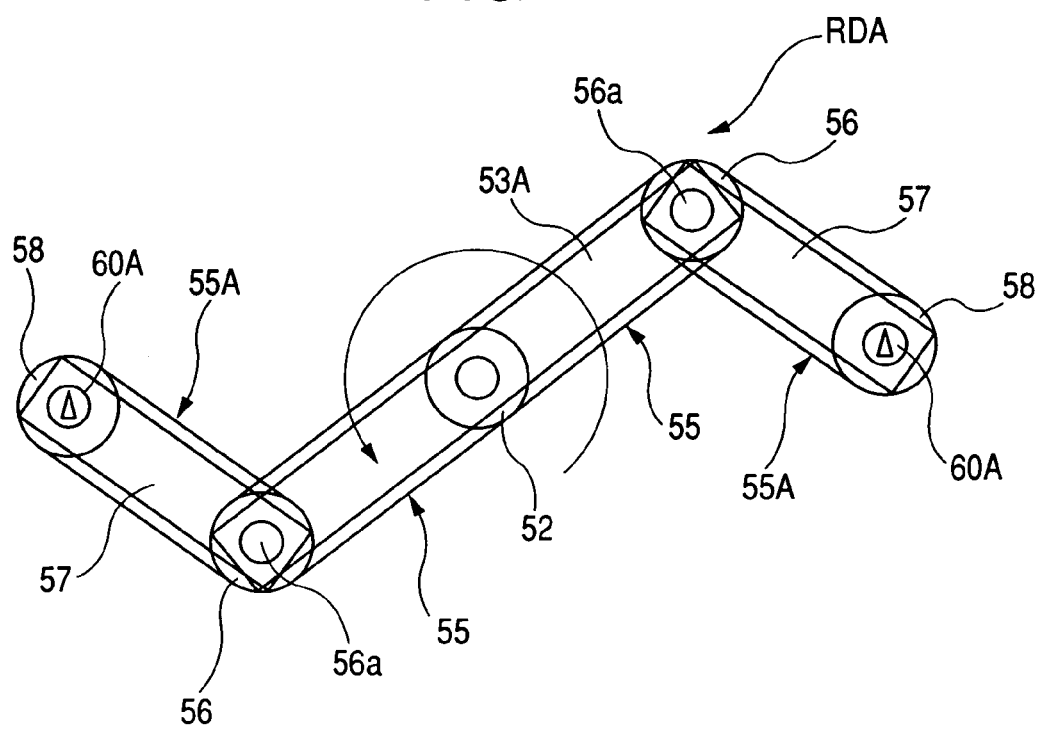
FIG. 17 is a plan view of a rotating and driving section used in a weaving machine of a first modified form according to the present invention.
Figure 18:
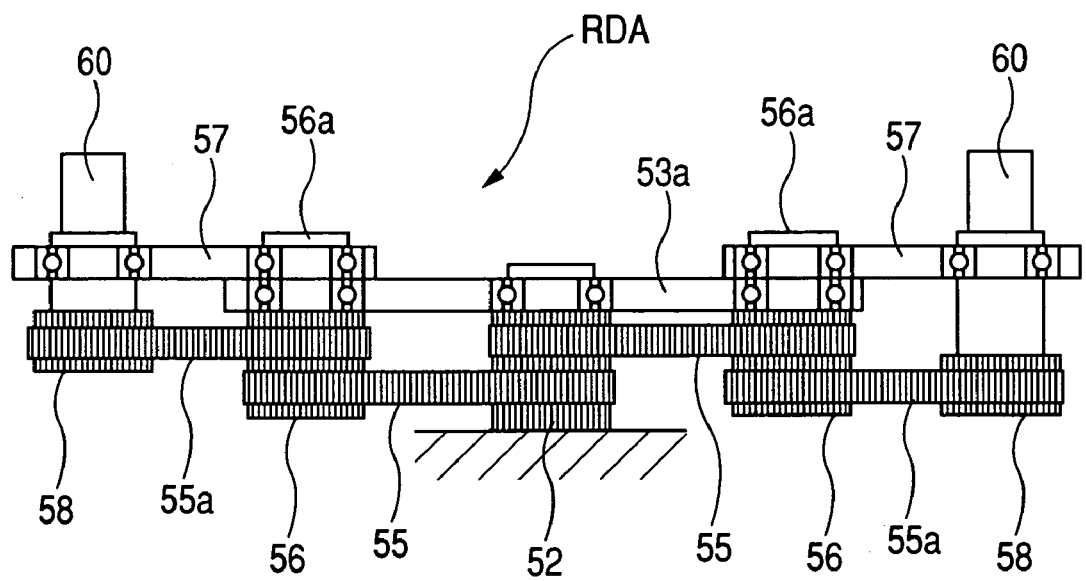
FIG. 18 is a side view of a rotating and driving section used in a weaving machine of a first modified form according to the present invention.

FIG. 17 is a plan view of a rotating and driving section RDA of a first modified form of the present embodiment and FIG. 18 is a side view of the rotating and driving section RDA shown in FIG. 17.

The rotating and driving section RDA of the first modified form is employed in place of the XY tables 61 and 61 adopted in the previous embodiment as means for moving the movable member in the X- and Y-directions.

As shown in FIGS. 17 and 18, the rotating and driving section RDA of the modified form 1 differs from the rotating and driving section RD of the weaving machine WM of the embodiment mentioned above in respect of features described below. That is, the rotary table 53 is replaced with a rotary arm 53A, formed in a rectangular plate-like configuration, and the rotary pulleys 54 and 54 are replaced with idling rotary pulleys 56 and 56 to remain in idling states, respectively. In addition, the rotating and driving section RDA further includes two connecting arms (acting as connecting members) 57 and 57, second rotary pulleys 58 and 58, and two timing belts (drive power transmitting members) 55A and 55B.

The connecting arms 57 and 57 have one ends pivotally supported with pivot members 56a and 56a of the idling rotary pulleys 56 and 56 via bearings, respectively. Second rotary pulleys 58 and 58 have shaft portions pivotally supported with the other ends of the connecting arms 57 and 57 via bearings to rotate relative to each other, respectively. The second rotary pulleys 58 and 58 and the idling rotary pulleys 56 and 56 have the same number of teeth. The timing belts 55A and 55A are tensioned between the second rotary pulleys 58 and 58 and the idling rotary pulleys 56 and 56. Moreover, with such a rotating and driving section RDA of the modified form 1 adopted in arrangement, movable members 60A and 60A are mounted on the second rotary pulleys 58 and 58, respectively.

With the rotating and driving section of such a structure described above, the timing belts 55 and 55 are operated when the drive motor is driven. This allows the idling rotary pulleys 56 and 56 to rotate on their axes and revolve about the axis of the stationary pulley 52 under the same attitudes, while causing the rotary arm 53a to rotate about the center of the axis of the stationary pulley 52. Thus, the second rotary pulleys 58 and 58 are caused to rotate on their axes in synchronism with the idling rotary pulleys 56 and 56 via the timing belts 55a and 55a, while rotating about the axes of the idling rotary pulleys 56 and 56 with the same attitude being sustained. This allows the movable members 60 and 60, mounted on the second rotary pulleys 58 and 58, to be movable in the X- and Y-directions on a plane perpendicular to the rotating axis of the rotary arm 53a.

With the rotating and driving section of the modified form 1, as set forth above, it becomes possible to allow means for moving the movable members 60 and 60 in the X- and Y-directions to be realized using a simplified structure.

[Second Modified Form]

Figure 19:
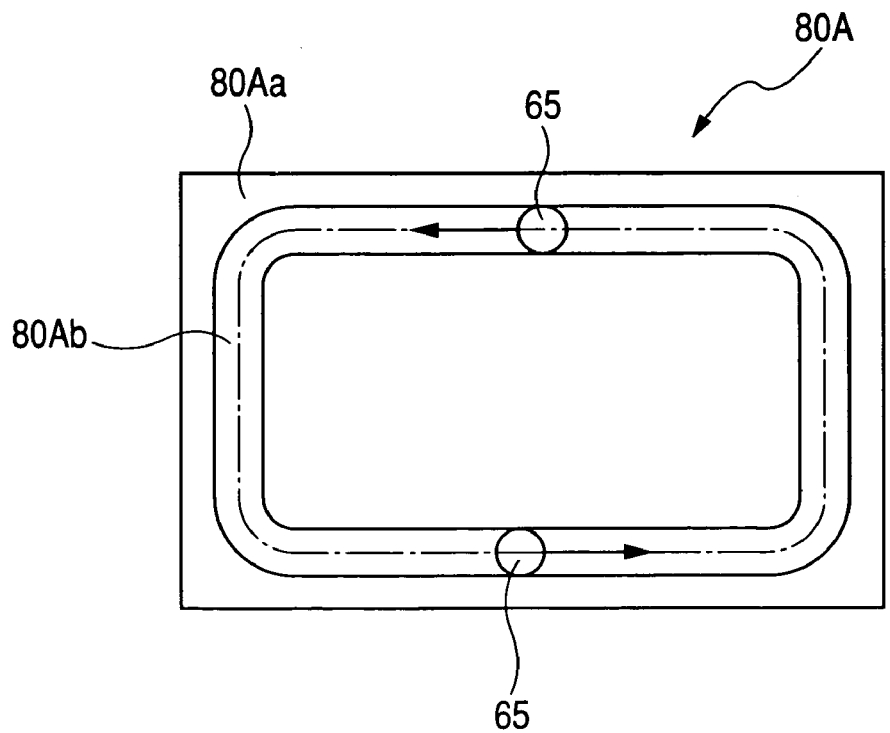
FIG. 19 is a plan view of an orbit specifying member used in a weaving machine of a second modified form according to the present invention.

FIG. 19 is a plan view of an orbit specifying member of a second modified form of the present embodiment.

The orbit specifying member 80A of the second modified form is located on the coil feed magazines 65 and 65 at the upper end portions thereof and takes the form of a structure including one sheet of nearly rectangular or oblong template 80Aa. The template 75Aa has one surface formed with a nearly rectangular or oblong guide recess 85Ab that allows the coil feed magazines 65 and 65 to have the rotating orbits specified in a nearly rectangular or oblong configuration. The template 75Aa is mounted on the shaft column 51 at an upper end thereof such that a center of the nearly rectangular or oblong guide recess 85Ab is placed on the axis of the shaft column 51. This allows the coil feed magazines 65 and 65 to be inserted to the guide recess 80Ab. Thus, the coil feed magazines 65 and 65 are guided to move in the guide recess 80Ab to rotate describing a nearly rectangular or oblong orbit when the coil feed magazines 65 and 65 rotate about the center of the axis (the rotating axis of the rotary table 53) of the column 51.

With the orbit specifying member 80A of such a structure, it becomes possible to specify the nearly rectangular or oblong orbit with the coil feed magazines 65 and 65 to move with high precision. Further, this enables the coil springs 74a and 74b, used in the previous embodiment, to be omitted in structure, thereby enabling the orbit specifying member 80A to be realized in a simplified structure.

[Third Modified Form]

Figure 20:
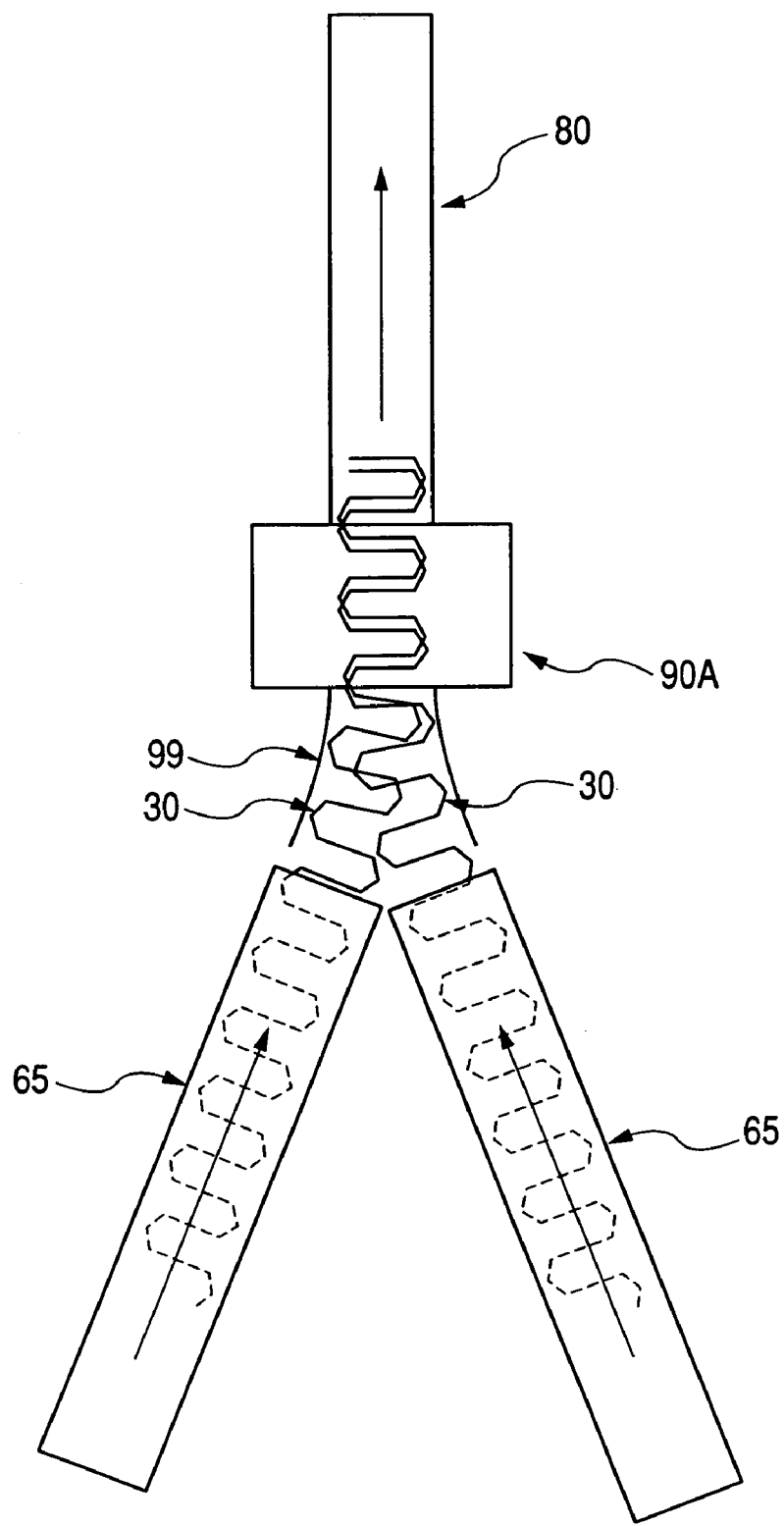
FIG. 20 is an illustrative view showing a layout position of a coil transfer device incorporated in a weaving machine of a third modified form according to the present invention.
Figure 21A:
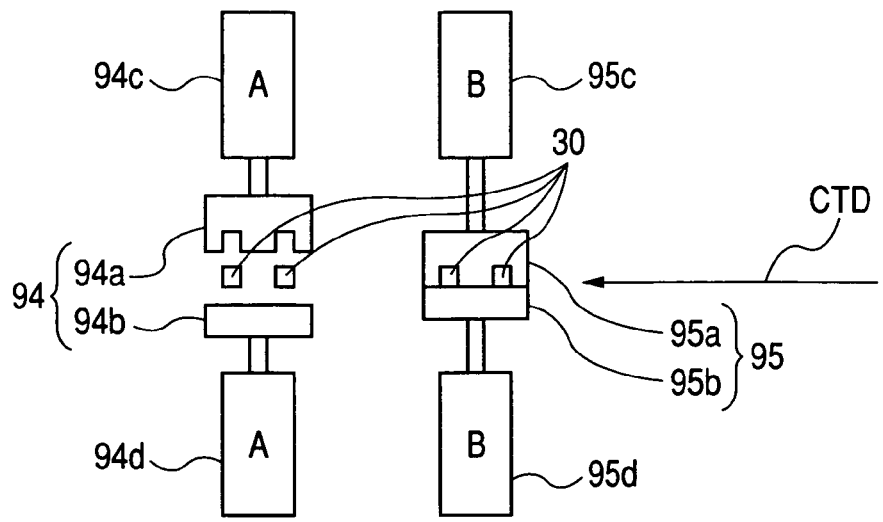
FIG. 21A is a plan view typically sowing the coil transfer device incorporated in the weaving machine of the third modified form according to the present invention.
Figure 21B:
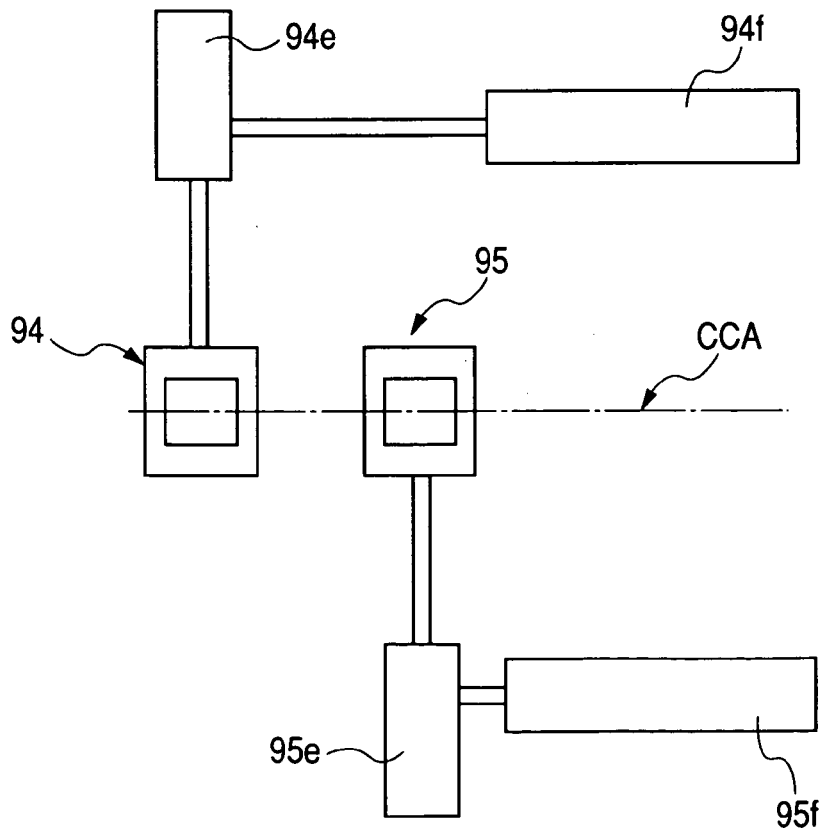
FIG. 21B is a front view of the coil transfer device shown in FIG. 21A.

FIG. 20 is an illustrative view showing a layout position of a coil transfer device of a third modified form of the present embodiment and FIGS. 21A and 21B typically show the coil transfer device shown in FIG. 20. FIG. 21A is a plan view and FIG. 21B is a front view.

As shown in FIG. 20, the coil transfer device 90A is disposed between the coil guide 99, placed on the coil feed magazines 65 and 65 at the outlets thereof, and the woven coil feed magazine 80.

As shown in FIGS. 21A and 21B, the coil transfer device 90A includes first and second clampers 94 and 95 placed on coil transfer paths in parallel to each other for gripping the coil wire segments 30 and 30. As shown in FIG. 21A, the first clamper 94 includes a pair of clamping claws 94a and 94b adapted to be driven with air cylinders 94c and 94d, respectively, to grip the coil wire segments 30 and 30, respectively. Likewise, the second clamper 95 includes a pair of clamping claws 95a and 95b adapted to be driven with air cylinders 95c and 95d, respectively, to grip the coil wire segments 30 and 30, respectively.

In FIG. 21A, reference "CTD" designates a coil transfer direction. In FIG. 21B, reference "CCA" designates a coil center axis.

As shown in FIG. 21B, the first clamper 94 is connected to an air cylinder 94c, acting as first vertical-direction moving means to allow the first clamper 94 to be movable in a direction perpendicular to a coil transfer direction, and an air cylinder 94f acting as first transfer-direction moving means to allow the first clamper 94 to move forward or rearward along the coil transfer direction. Likewise, the second clamper 95 is connected to an air cylinder 95e, acting as second vertical-direction moving means to allow the first clamper 95 to be movable in the direction perpendicular to the coil transfer direction, and an air cylinder 95f acting as second transfer-direction moving means to allow the second clamper 95 to move forward or rearward along the coil transfer direction.

With such a structure mentioned above, the coil transfer device 90A remains first in a state shown in FIGS. 21A and 21B and operates under states shown in FIGS. 22A to 22C and FIGS. 23A and 23B, thereby permitting the woven coil wife segments 30 and 30 to be transferred. In particular, under the operating state shown in FIG. 22A, the first clamper 94, placed in the coil transfer direction at a downstream thereof, allows the pair of clamping claws 94a and 94b to remain in an unclamped position to release the gripping of the coil wire segments 30 and 30. Thereafter, the air cylinder 94e is drivably actuated to cause the first clamper 94 in a direction D1 (i.e., upward in FIG. 22A) perpendicular to the coil transfer direction.

As shown in FIG. 22B, further, the air cylinder 95f is actuated to operate the second clamper 95 such that the second clamper 95 is moved (transferred) to a downstream of the coil transfer direction with the coil wire segments 30 and 30 being held under gripped states. At the same time, as shown in FIG. 22C, with the air cylinder being actuated, the first clamper 94, moved to the upstream side of the coil transfer direction, is caused to move in a direction (i.e., downward as shown in FIG. 22C) perpendicular to the coil transfer direction, upon which the first clamper 94 is halted under a state located on the coil transfer path.

Figure 23B:
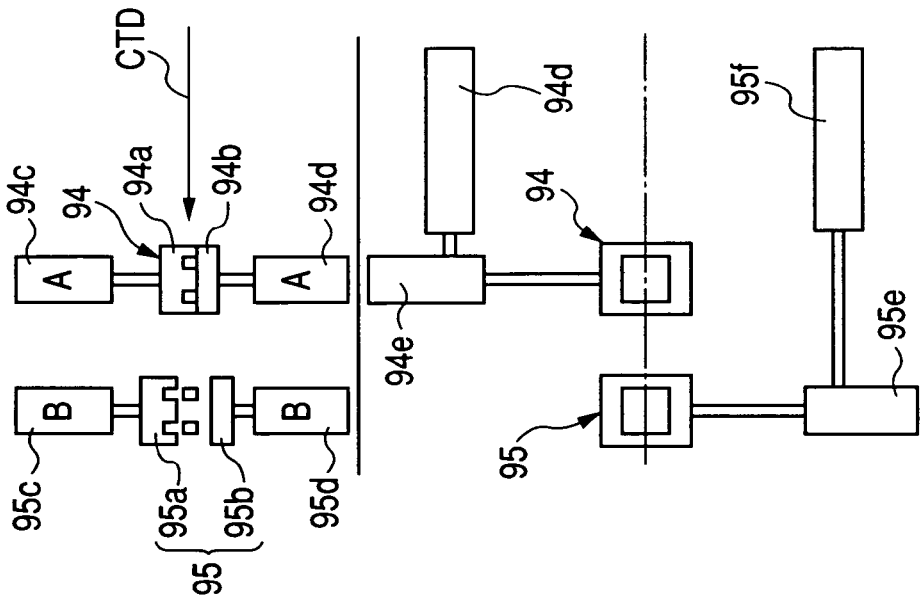
FIGS. 23A and 23B are illustrative views showing how the coil transfer device, incorporated in the weaving machine of the third modified form, performs the coil transfer operation in various steps.
Figure 23A:
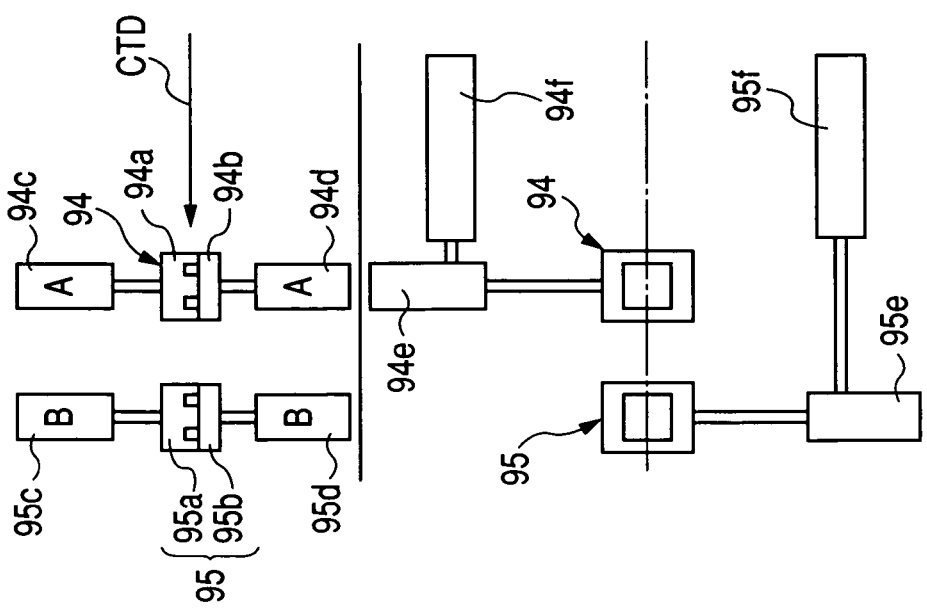

Under such a halted state, as shown in FIG. 23A, the first clamper 94 both the air cylinders 94c and 94d are driven to cause the pair of clamping claws 94a and 94b to grip the coil wire segments 30 and 30. As shown in FIG. 23B, thereafter, the second clamper 95, placed in the downstream of the coil transfer direction, allow the pair of clamping claws 95a and 95b to release the gripping of the coil wire segments 30 and 30. The state, shown in FIG. 23B, represents a state changed from the state shown in FIGS. 21A and 21B to a state under which the first clamper 94 is replaced with the second clamper 95. Thus, subsequently, the first clamper 94 repeatedly executes the same operation as the second clamper 95 and the second clamper 95 repeatedly executes the same operation as the first clamper 94, thereby transferring the coil wire segments 30 and 30.

As set forth above, with the coil transfer device 90A of the third modified form, the coil transfer device can be realized in a simplified structure to enable the woven coil wire segments 30 and 30 to be transferred in a reliable and stable manner. In this case, the use of the first and second clampers 94 and 95 results in a capability of further increasing reliability and stability of transfer.

[Fourth Modified Form]

Figure 24:
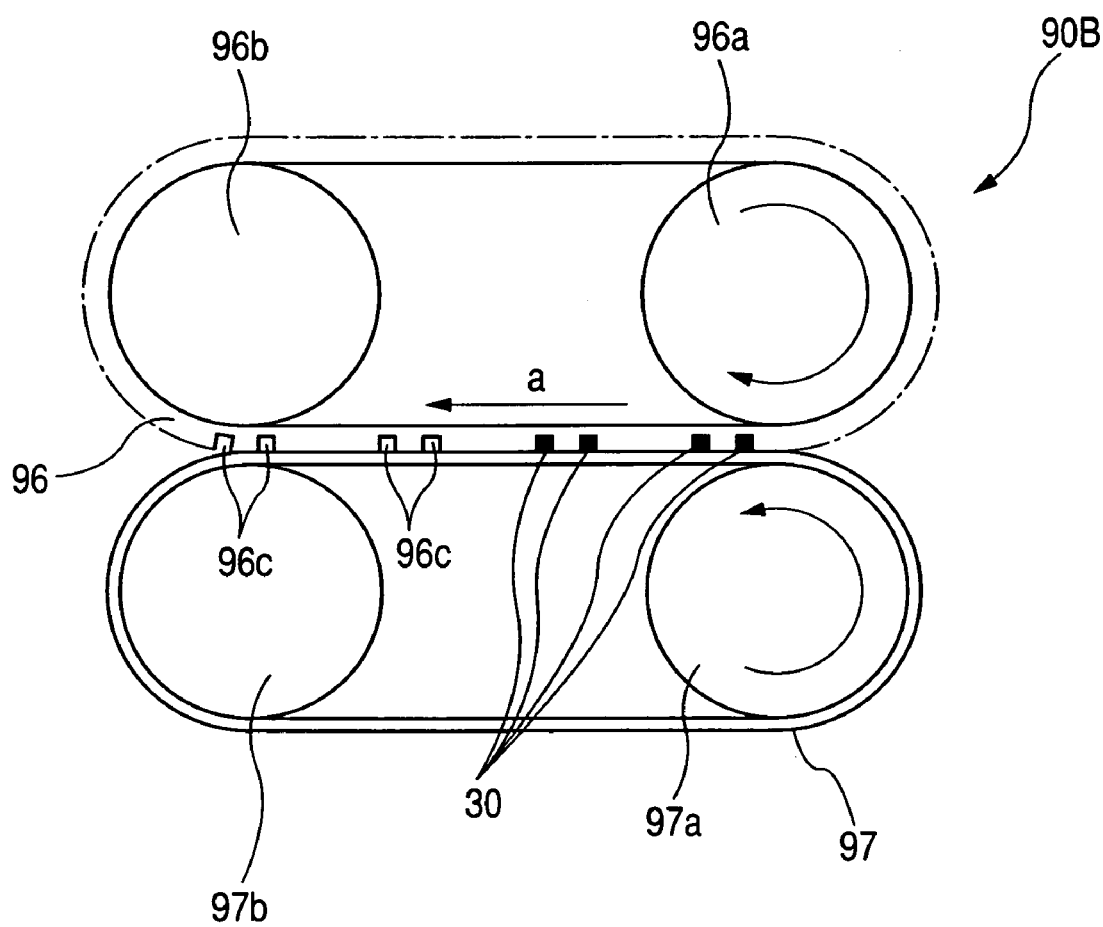
FIG. 24 is a front view of a coil transfer device incorporated in a weaving machine of a fourth modified form according to the present invention.

FIG. 24 is a plan view showing a coil transfer device of a fourth modified form of the coil transfer device of the present invention. As shown in FIG. 24, the coil transfer device 90B of the fourth modified form takes the form of a structure including a first transfer belt 96 and a second transfer belt 97, placed in opposition to the first transfer belt 96, between which the woven coil wire segments 30 and 30 are pinched in transfer.

The first transfer belt 96 is tensioned between a drive pulley 96a, adapted to be drivably rotated with a drive motor (not shown), and a driven pulley 96b, to go around the drive pulley 96a and the driven pulley 96b in a direction indicated by an arrow "a" upon driving the drive pulley 96a. The first transfer belt 96 has a transfer surface formed with a plurality of pairs of concave recesses 96c and 96c, which the coil wire segments 30 and 30 is brought into engagement, with adjacent pairs being circumferentially spaced from each other by a given distance. Likewise, the second transfer belt 97 is tensioned between a drive pulley 97a, adapted to be drivably rotated with a drive motor (not shown), and a driven pulley 97b, to go around the drive pulley 97a and the driven pulley 97b in the direction indicated by the arrow "a" upon driving the drive pulley 97a. The second transfer belt 97 is located in face-to-face relation to the first transfer belt 96 such that a transfer surface of the second transfer belt 97 is held in pressured contact with the transfer surface of the transfer surface of the first transfer belt 96.

With the coil transfer device 90B of the fourth modified form of such a structure set forth above, the use of the first transfer belt 96, formed with the plurality of concaved recesses 96c and 96c, and the second transfer belt 97 placed in opposition to the first transfer belt 96 enables the woven coil wire segments 30 and 30 to be transferred in a reliable and stable manner. Also, the coil transfer device 90B can be realized using an extremely simplified structure.

While the specific embodiments of the present invention have been described in detail, it will be appreciated by those skilled in the art that various modifications and alternatives to those details could be developed in light of the overall teachings of the disclosure. Accordingly, the particular arrangements disclosed are meant to be illustrative only and not limited to the scope of the present invention, which is to be given the full breadth of the following claims and all equivalents thereof.

What is claimed is:

1. A weaving machine for a coil assembly of a rotary electric machine by weaving a plurality of coil wire segments, each having a plurality of turn portions, the weaving machine comprising:

a rotating and driving section including a stationary pulley coaxially fixed to a shaft column mounted on a base, a rotary member rotatably supported by the shaft column so as to be rotatable about a center axis of the shaft column, a plurality of rotary pulleys supported by the rotary member so as to be relatively rotatable, and drive-force transmitting members engaged between the rotary pulleys and the stationary pulley, the rotating and driving section being configured such that the rotary pulleys rotate on axes thereof while rotating about an axis of the stationary pulley keeping the same attitudes;

a plurality of movable members located above the rotary pulleys and being movable in X- and Y-directions on a plane perpendicular to a rotating axis of the rotary member;

a plurality of coil feed magazines including first transfer paths through which the coil wire segments are transferred, and placed in inclined state such that axes of the coil wire segments swingably supported by the movable member through pivots at one ends thereof and being transferred through the first transfer paths to the other end side cross on the rotating axis;

an orbit specifying member for specifying an orbit of the coil feed magazines during rotation;

a rotation synchronizing member for causing the coil feed magazines to rotate in synchronism with each other; and a coil transfer device that grips and transfers woven coil wire segments in a state where the turn portions of the coil wire segments cross one another.

2. The weaving machine for the coil assembly according to claim 1, wherein the orbit specified by the orbit specifying member has a nearly rectangular or oblong shape.

3. The weaving machine for the coil assembly according to claim 1, wherein the rotary pulley has the same number of teeth as that of the stationary pulley, and configured to maintain the same attitude by rotating one revolution about an axis thereof while rotating one revolution about the axis of the stationary pulley.

4. The weaving machine for the coil assembly according to claim 1, wherein the movable members are disposed on XY movable tables, each XY movable table including an X-table having X-rails extending in an X-direction and placed on each rotary pulley, and a Y-table having Y-rails extending in a Y-direction and placed on the X-rails so as to be movable in the X-direction.

5. The weaving machine for the coil assembly according to claim 1, wherein the rotary pulleys of the rotating and driving section are idling rotary pulleys, and the rotating and driving section includes a plurality of connecting members connected to shaft portions of the idling rotary pulleys at one ends thereof connecting members, a plurality of second rotary pulleys supported by the other ends of the connecting members so as to be relatively rotatable, and drive-force transmitting members engaged between the second rotary pulleys and the idling rotary pulleys, the movable members being mounted on the second rotary pulleys.

6. The weaving machine for the coil assembly according to claim 1, wherein the orbit specifying member is provided so as to specify the orbit at plural positions in longitudinal directions of the coil feed magazines.

7. The weaving machine for the coil assembly according to claim 1, wherein the orbit specifying member includes a template having an outer periphery formed in a rectangular shape, and a spring member for urging the coil feed magazines to be pressed against an outer circumferential edge of the template.

8. The weaving machine for the coil assembly according to claim 1, wherein the orbit specifying member includes a template formed with a rectangular guide recess for specifying rotating orbits of the coil feed magazines.

9. The weaving machine for the coil assembly according to claim 1, wherein the rotation synchronizing member has elongated slots through which the coil feed magazines are inserted and held therein, the elongated slots allowing the coil feed magazines to be displaced in a centripetal direction and a radial direction while restricting displacement in a rotating direction during rotation of the coil feed magazines.

10. The weaving machine for the coil assembly according to claim 1, wherein the coil transfer device includes clampers for gripping the woven coil wire segments, and a moving means for moving the clampers.

11. The weaving machine for the coil assembly according to claim 10, wherein the coil transfer device includes first and second dampers placed on coil transfer paths in parallel to each other, a first vertical-direction moving means for moving the first clamper in a direction perpendicular to a coil transfer direction, a first transfer-direction moving means for moving the first clamper in forward or rearward direction along the coil transfer direction, a second vertical-direction moving means for moving the second clamper in the direction perpendicular to the coil transfer direction, and a second transfer-direction moving means for moving the second clamper in the forward or rearward direction along the coil transfer direction.

12. The weaving machine for the coil assembly according to claim 1, wherein the coil transfer device includes a first belt, and a second belt placed opposite to the first belt, the woven coil wire segments being transferred while being pinched between the first and second belts to be transferred.

13. The weaving machine for the coil assembly according to claim 1, further comprising a coil guide located on the outlet side of the coil feed magazines for guiding the coil wire segments being transferred from the outlets of the first transfer paths to a weaving section.

14. The weaving machine for the coil assembly according to claim 1, further comprising woven coil-use magazine located on the outlet side of the respective coil feed magazines and having second transfer paths for transferring the woven coil wire segments.

* * * * *